United States Patent
Wang et al.

(10) Patent No.: US 10,437,359 B1
(45) Date of Patent: Oct. 8, 2019

(54) STYLUS WITH EXTERNAL MAGNETIC INFLUENCE

(71) Applicant: Apple Inc., Cupertino, CA (US)

(72) Inventors: Paul X. Wang, Cupertino, CA (US);
Joel N. Ruscher, Cupertino, CA (US);
Reza Nasiri Mahalati, Cupertino, CA (US); Craig C. Leong, Cupertino, CA (US); David L. Christensen, Cupertino, CA (US)

(73) Assignee: APPLE INC., Cupertino, AR (US)

( * ) Notice: Subject to any disclaimer, the term of this patent is extended or adjusted under 35 U.S.C. 154(b) by 0 days.

(21) Appl. No.: 15/445,383

(22) Filed: Feb. 28, 2017

(51) Int. Cl.
| | |
|---|---|
| *G06F 3/033* | (2013.01) |
| *G06F 3/038* | (2013.01) |
| *G06F 3/0354* | (2013.01) |
| *G06F 3/041* | (2006.01) |
| *G06F 3/01* | (2006.01) |
| *G06F 3/0488* | (2013.01) |

(52) U.S. Cl.
CPC ............ *G06F 3/0383* (2013.01); *G06F 3/016* (2013.01); *G06F 3/03545* (2013.01); *G06F 3/041* (2013.01); *G06F 3/0488* (2013.01)

(58) Field of Classification Search
CPC ...... G06F 3/0383; G06F 3/0488; G06F 3/016; G06F 3/03545; G06F 3/041
See application file for complete search history.

(56) References Cited

U.S. PATENT DOCUMENTS

| | | | |
|---|---|---|---|
| 5,196,745 A | 3/1993 | Trumper et al. | |
| 5,293,161 A | 3/1994 | MacDonald et al. | |
| 5,424,756 A | 6/1995 | Ho et al. | |
| 5,434,549 A | 7/1995 | Hirabayashi et al. | |
| 5,436,622 A | 7/1995 | Gutman et al. | |
| 5,668,423 A | 9/1997 | You et al. | |
| 5,842,967 A | 1/1998 | Kroll | |
| 5,739,759 A | 4/1998 | Nakazawa et al. | |
| 6,084,319 A | 7/2000 | Kamata et al. | |
| 6,342,880 B2 | 1/2002 | Rosenberg et al. | |
| 6,373,465 B2 | 4/2002 | Jolly et al. | |
| 6,388,789 B1 | 5/2002 | Bernstein | |

(Continued)

FOREIGN PATENT DOCUMENTS

| | | |
|---|---|---|
| CN | 101036105 | 9/2007 |
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Nelson M Rosario
*Assistant Examiner* — Andrew Lee
(74) *Attorney, Agent, or Firm* — Brownstein Hyatt Farber Schreck, LLP

(57) ABSTRACT

An interface system may include an electronic device defining an input surface, a stylus comprising a magnetic component and configured to provide input to the electronic device via the input surface, and a magnetic field generator coupled to the electronic device and configured to produce a magnetic field to impart a force on the magnetic component of the stylus.

21 Claims, 24 Drawing Sheets

(56) References Cited

U.S. PATENT DOCUMENTS

| | | |
|---|---|---|
| 6,438,393 B1 | 8/2002 | Surronen |
| 6,445,093 B1 | 9/2002 | Binnard |
| 6,493,612 B1 | 12/2002 | Bisset et al. |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,654,524 B2 | 2/2014 | Pance et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,535,500 B2 | 1/2017 | Pasquero et al. |
| 9,539,164 B2 | 1/2017 | Sanders et al. |
| 9,557,830 B2 | 1/2017 | Grant |
| 9,557,857 B2 | 1/2017 | Schediwy |
| 9,600,037 B2 | 3/2017 | Pance et al. |
| 9,607,491 B1 | 3/2017 | Mortimer |
| 9,632,583 B2 | 4/2017 | Virtanen et al. |
| 9,707,593 B2 | 7/2017 | Berte |
| 9,829,981 B1 | 11/2017 | Ji |
| 9,875,625 B2 | 1/2018 | Khoshkava et al. |
| 9,904,393 B2 | 2/2018 | Frey et al. |

(56) References Cited

U.S. PATENT DOCUMENTS

| | | |
|---|---|---|
| 9,927,902 B2 | 3/2018 | Burr et al. |
| 9,940,013 B2 | 4/2018 | Choi et al. |
| 9,996,199 B2 | 6/2018 | Park |
| 10,025,399 B2 | 7/2018 | Kim et al. |
| 10,037,660 B2 | 7/2018 | Khoshkava et al. |
| 2003/0117132 A1 | 6/2003 | Klinghult |
| 2005/0036603 A1 | 2/2005 | Hughes |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0135164 A1* | 5/2009 | Kyung ............... G06F 3/016 345/179 |
| 2009/0166098 A1 | 7/2009 | Sunder |
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2009/0313542 A1 | 12/2009 | Cruz-Hernandez et al. |
| 2010/0116629 A1 | 5/2010 | Borissov et al. |
| 2010/0225600 A1 | 9/2010 | Dai et al. |
| 2010/0231508 A1 | 9/2010 | Cruz-Hernandez et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2011/0261021 A1 | 10/2011 | Modarres et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian |
| 2012/0306824 A1* | 12/2012 | Horie ............... G06F 3/03545 345/179 |
| 2012/0319827 A1 | 12/2012 | Pance et al. |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0076635 A1 | 3/2013 | Lin |
| 2013/0207793 A1 | 8/2013 | Weaber et al. |
| 2013/0278401 A1 | 10/2013 | Flaherty et al. |
| 2014/0062948 A1* | 3/2014 | Lee ............... G06F 3/0418 345/174 |
| 2014/0125470 A1 | 5/2014 | Rosenberg |
| 2014/0168175 A1* | 6/2014 | Mercea ............... G06F 3/046 345/179 |
| 2015/0097800 A1 | 4/2015 | Grant et al. |
| 2015/0116205 A1 | 4/2015 | Westerman et al. |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0277562 A1 | 5/2015 | Bard et al. |
| 2015/0234493 A1 | 8/2015 | Parivar et al. |
| 2015/0293592 A1 | 10/2015 | Cheong et al. |
| 2015/0338919 A1 | 11/2015 | Weber et al. |
| 2015/0349619 A1 | 12/2015 | Degner et al. |
| 2016/0011664 A1 | 1/2016 | Silvanto et al. |
| 2016/0098107 A1 | 4/2016 | Morrell et al. |
| 2016/0171767 A1 | 6/2016 | Anderson et al. |
| 2016/0209979 A1 | 7/2016 | Endo et al. |
| 2016/0293829 A1 | 10/2016 | Maharjan et al. |
| 2016/0327911 A1 | 11/2016 | Eim et al. |
| 2016/0328930 A1 | 11/2016 | Weber et al. |
| 2016/0379776 A1 | 12/2016 | Oakley |
| 2017/0003744 A1 | 1/2017 | Bard et al. |
| 2017/0024010 A1 | 1/2017 | Weinraub |
| 2017/0111734 A1 | 4/2017 | Macours |
| 2017/0249024 A1 | 8/2017 | Jackson et al. |
| 2017/0285843 A1 | 10/2017 | Roberts-Hoffman et al. |
| 2017/0337025 A1 | 11/2017 | Finnan et al. |
| 2018/0014096 A1 | 1/2018 | Miyoshi |
| 2018/0029078 A1 | 2/2018 | Park et al. |
| 2018/0074547 A1* | 3/2018 | Smadi ............... H02J 7/00 |
| 2018/0181204 A1 | 6/2018 | Weinraub |
| 2018/0194229 A1 | 7/2018 | Wachinger |

FOREIGN PATENT DOCUMENTS

| | | |
|---|---|---|
| CN | 101663104 | 3/2010 |
| CN | 101872257 | 10/2010 |
| CN | 201945951 | 8/2011 |
| CN | 102349039 | 2/2012 |
| CN | 203405773 | 1/2014 |
| CN | 203630729 | 6/2014 |
| CN | 104679233 | 6/2015 |
| CN | 105144052 | 12/2015 |
| CN | 106133650 | 11/2016 |
| CN | 206339935 | 7/2017 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| KR | 101016208 | 2/2011 |
| TW | 2010038305 | 10/2010 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |
| WO | WO 2016/091944 | 6/2016 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Author Unknown, "3D Printed Mini Haptic Actuator," Autodesk, Inc., 16 pages, 2016.

Stein et al., "A process chain for integrating piezoelectric transducers into aluminum die castings to generate smart lightweight structures," Results in Physics 7, pp. 2534-2539, 2017.

\* cited by examiner

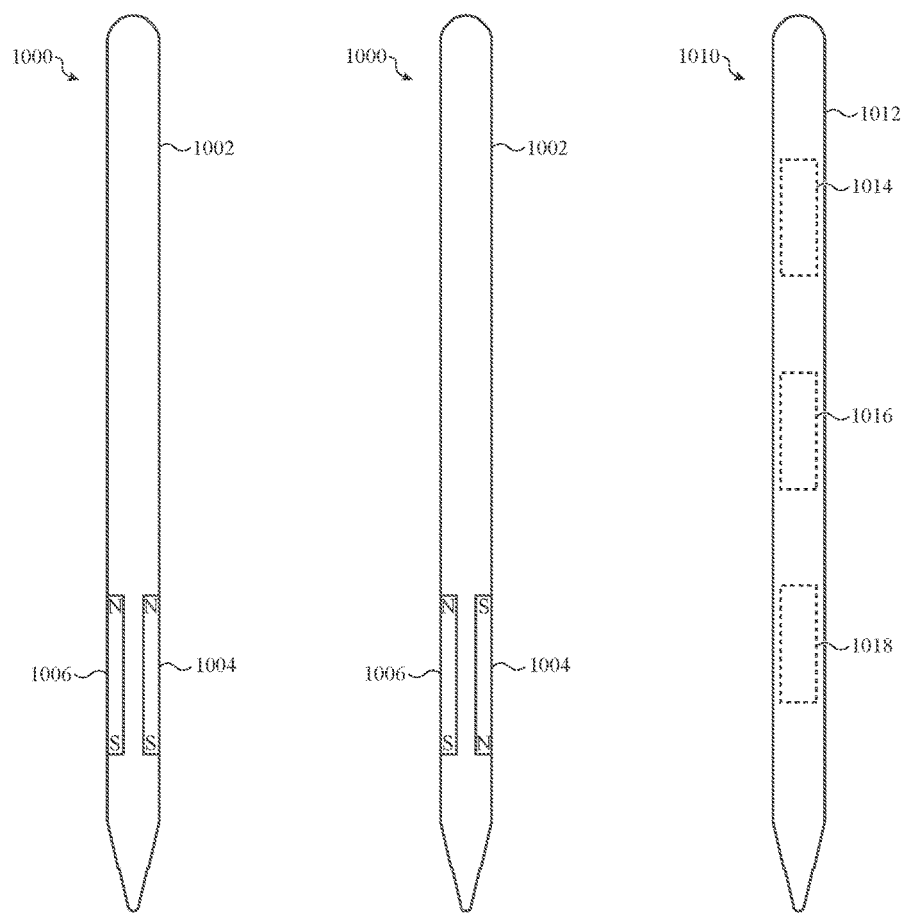

STYLUS WITH EXTERNAL MAGNETIC INFLUENCE

FIELD

The described embodiments relate generally to electronic devices, and more particularly, to an interface system that produces force and/or motion-based outputs on a stylus using external magnetic influence.

BACKGROUND

Styluses can be used to provide inputs to electronic devices with touch-sensitive input devices, such as touchscreens, drawing tablets, and the like. For example, styluses may be used to draw images, input text, and manipulate user interface objects. Styluses may improve the accuracy and/or precision of touch inputs. As such, they may enable or facilitate more or different types of inputs than are feasible with a finger, keyboard, or mouse. Styluses are primarily input devices and do not provide output or feedback to a user.

SUMMARY

Some example embodiments are directed to interface systems in which a stylus is subjected to an external magnetic influence to produce various types of motion and/or forces. An interface system may include an electronic device defining an input surface, a stylus comprising a magnetic component and configured to provide input to the electronic device via the input surface, and a magnetic field generator associated with the electronic device and configured to produce a magnetic field to impart a force on the magnetic component of the stylus.

The electronic device may include a housing and a display within the housing, and the input surface may be a surface of the display. The magnetic field generator may include a conductive coil within the housing and circuitry configured to energize the conductive coil to produce the magnetic field. The conductive coil may be coupled to a substrate that is positioned under the input surface. The electronic device may include a magnetic shunt positioned under the substrate. The magnetic field may extend from within the housing, through the display, and through the input surface, and the magnetic component may be configured to interact with the magnetic field.

The magnetic field generator may include a group of conductive coils coupled to the substrate. The group of conductive coils may be positioned in an overlapping arrangement on the substrate.

The interface system may include a dock configured to receive the electronic device and the magnetic field generator may be within the dock.

A system for magnetically influencing an input device may include a computing device comprising an enclosure and a touchscreen within the housing and configured to detect a location of an input device on an exterior surface of the touchscreen. The electronic device may also include an electromagnetic coil within the housing and configured to produce a magnetic field above the exterior surface of the touchscreen in response to detecting the location of the input device on the exterior surface, thereby producing a tactile output via the input device. The computing device may include control circuitry configured to control the electromagnetic coil in order to produce an alternating magnetic field.

The input device may include a body and a magnetic element within the body. The electromagnetic coil may be configured to produce the magnetic field around the magnetic element of the input device. The magnetic element may be a permanent magnet or an electromagnetic coil.

The electromagnetic coil may be a first electromagnetic coil, the magnetic field may be a first magnetic field, and the magnetic element may be a second electromagnetic coil. The input device may include a power source and circuitry configured to power the second electromagnetic coil to produce a second magnetic field.

The input device may include a spring movably supporting the magnetic element to the body. The movably supported magnetic element may have a resonant frequency between about 150 Hz and about 250 Hz.

A method may include detecting, at an electronic device with a touch sensor and a magnetic field generator, a touch input from an input device having a magnetic component, and in response to detecting the touch input, producing a magnetic field with the magnetic field source, thereby imparting a force on the magnetic component of the input device.

Detecting the touch input may include detecting the input device at a first location on an input surface of the electronic device, and the method may further include detecting the input device at a second location on the input surface, the second location different from the first location, and in response to detecting the input device at the second location, ceasing to produce the magnetic field. The first location may be outside of an input path along the input surface, and the second location may be within the input path.

The method may include determining a predicted input path based on at least one of a location and a direction of the touch input, and the input path may correspond to the predicted input path.

The method may include determining a target location of the input device on an input surface of the electronic device, and producing the magnetic field may include producing the magnetic field such that the force imparted on the magnetic component is in a direction of the target location. The magnetic field source may include a plurality of coils, and producing the magnetic field may include determining a combination of coils that will produce the magnetic field such that the force imparted on the magnetic component is in the direction of the target location, and actuating the determined combination of coils.

BRIEF DESCRIPTION OF THE DRAWINGS

The disclosure will be readily understood by the following detailed description in conjunction with the accompanying drawings, wherein like reference numerals designate like structural elements, and in which:

FIGS. 10A-10C depict additional example styluses.

DETAILED DESCRIPTION

Figure 1A:
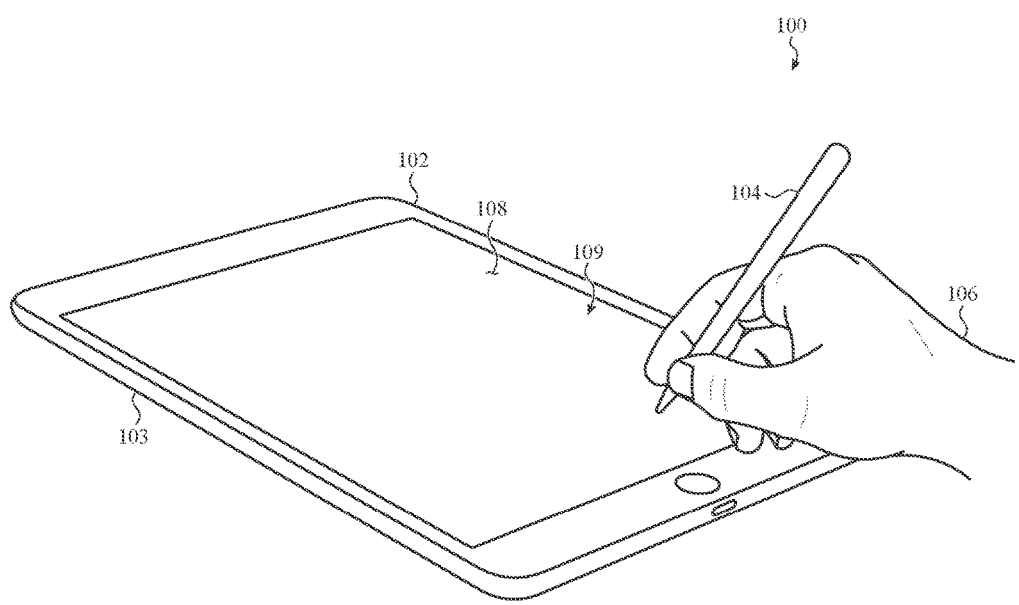
FIGS. 1A-1B depict an electronic device and stylus of an interface system.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to an interface system in which force and/or motion outputs are provided to a user through an input device, such as a stylus. Styluses may be used to provide inputs to devices with touch-sensitive input surfaces, such as drawing tablets, tablet computers with touchscreens, and the like. However, being primarily input devices, many styluses do not provide any force or haptic outputs to the user. Accordingly, systems are described herein in which a stylus can produce force and/or motion-based outputs, such as forces (e.g., directional forces), vibrations, oscillations, or the like. Such outputs may provide users with useful feedback or information relating to the input being provided by the stylus, or related to any other aspect of the device or the stylus. For example, force and/or motion-based outputs may indicate when a stylus is deviating from an intended or predicted path (e.g., while drawing or writing), or they may be used to help differentiate or delimit different regions of an input surface (e.g., to indicate the location or boundary of an icon or other affordance). These and other uses may also improve device accessibility for visually or hearing impaired users.

An interface system, as described herein, may include an input device, such as a stylus, and an electronic device with a touch-sensitive input surface, such as a touchscreen. The input device may include a magnetic component or element, such as a ferromagnetic material, a permanent magnet, or an electromagnetic coil. The electronic device may include or be associated with magnetic field sources or generators, such as electromagnetic coils, that produce magnetic fields. The magnetic fields interact with the magnetic component in the input device (e.g., the stylus) to produce forces and/or motions (e.g., directional forces, vibrations, or the like) on the input device. For example, an electronic device, such as a tablet computer, may include coils within its housing or enclosure. The coils may be energized to produce a magnetic field above the input surface of the electronic device. When the input device is within the magnetic field, such as when the input device is being used to provide input to the electronic device, the magnetic component in the input device may be subjected to forces due to the interaction with the magnetic field. Such forces may produce vibrations, oscillations, linear or directional forces, or other haptic effects that may be felt and/or heard by the holder of the input device. Various combinations of magnetic field sources or generators and magnetic components or magnetic elements can be used in an input device and an electronic device to produce force and/or motion-based outputs. For example, an electronic device may include electromagnetic coils and the input device may include a permanent magnet. Alternatively, the electronic device may include permanent magnets while the input device may include an electromagnetic coil. Other combinations are also possible, as described herein.

Depending on the particular configuration of the electronic device and the input device (e.g., stylus), various different types of forces may be produced. For example, the interface system (which may include the electronic device and input device, among other possible components) may be configured to oscillate or vibrate the input device. As another example, the interface system may be configured to repel or attract the input device in a direction normal to the input surface. As yet another example, the interface system may be configured to apply a directional force that is substantially parallel to the input surface (or has a component that is parallel to the input surface).

These or other types of outputs and forces may be used alone or in various combinations to provide feedback to a user. Such feedback may be used to indicate a preferred path for the input device. For example, an electronic device may be used to train a user how to write letters. A traceable letter outline may be displayed on the electronic device for a user to trace with the input device. The electronic device may determine, using a touch-sensitive input device, whether the user is accurately tracing the letter. When the user deviates from the displayed letter, the electronic device may cause the input device to vibrate to indicate that the user has deviated. Alternatively or additionally, the electronic device may cause the input device to be forced in a direction that will lead the user back to the displayed letter. The input device may be also or instead be magnetically attracted to the electronic device to increase the amount of force required to slide the input device across the input surface until the input device returns to the displayed letter. Such functions, as well as systems and components for producing such forces, are described herein.

FIG. 1A depicts an interface system 100 including an electronic device 102 (e.g., a computing device) and a stylus 104 (e.g., an input device). The electronic device 102 may include an enclosure (e.g., the housing 103), a display 109 within and/or coupled to the enclosure, and a cover 108 above the display 109. The cover 108 may define an input surface, which may be an exterior surface of the device 102, on which touch inputs are provided to the device 102 (e.g., from a finger or the stylus 104 or any other suitable object).

The display 109 may be adhered to, laminated with, or positioned to contact a bottom surface of the cover 108. The display 109 may include a stack of multiple elements that facilitate the rendering of images including, for example, a transparent circuit layer, a color filter layer, a polarizer layer, and other elements or layers. The display 109 may be implemented with any suitable display technology including, but not limited to, liquid-crystal display (LCD) technology, light-emitting diode (LED) technology, organic light-emitting diode (OLED) technology, electroluminescent technology, and the like. The display 109 may also include other layers for improving its structural or optical performance, including, for example, glass sheets, polymer sheets, polarizer sheets, color masks, rigid or resilient frames, and the like.

In some cases, the electronic device 102 may not include a display. For example, the electronic device 102 is shown in the figures as a tablet computing device as an example only; other electronic and/or computing devices (with or without displays positioned below the cover 108) are envisioned. For example, the electronic device 102 of the interface system 100 can be implemented as a peripheral input device, a trackpad, a drawing tablet, or the like.

The electronic device 102 may also include a touch-sensitive input device positioned below, or integrated with, the cover 108 and/or the display 109 of the electronic device 102. The electronic device 102 utilizes the touch-sensitive input device (or touch sensor) to, among other purposes, detect the presence and/or location of the stylus 104 on the exterior input surface.

The stylus 104 may take various forms to facilitate use and manipulation by the user 106. In the illustrated example, the stylus 104 has the general form of a writing instrument such as a pen or a pencil. In the illustrated embodiment, the stylus 104 includes a cylindrical body or barrel with two ends; however, other shapes and configurations are also possible. The user 106 may slide the tapered tip of the stylus 104 across the cover 108 to input information to the electronic device 102. The electronic device 102 can interpret the user's manipulation of the stylus 104 in any implementation-specific and suitable manner. The stylus 104 is an input device, and may also facilitate or produce force and/or motion-based outputs, as described herein.

Figure 1B:
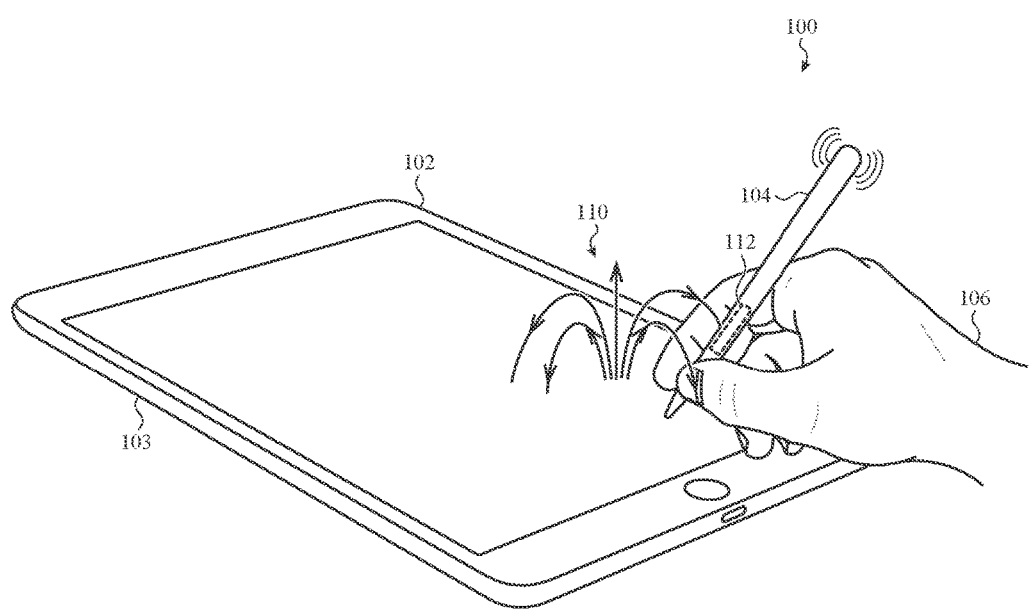

FIG. 1B shows the interface system 100 in an active state, with the input device (e.g., the stylus 104), and in particular a magnetic component 112 of the stylus 104, being subjected to a magnetic field 110. The magnetic component 112 may be any suitable material or component that responds to or interacts with a magnetic field. For example, the magnetic component 112 may be a permanent magnet (e.g., neodymium iron boron, samarium cobalt, alnico, ceramic, or ferrite magnets), an electromagnetic coil (e.g., a conductive coil with a power source such as a battery, capacitor, etc.), an electromagnet, or a magnetic material such as steel, iron, or the like.

As shown in FIG. 1B, the magnetic field 110 is emanating from the electronic device 102, though this is merely one example of a source of a magnetic field. In other examples, the magnetic field 110 may emanate from or be generated by a different component, such as an accessory, dock, or case associated with the electronic device 102.

The presence of the magnetic component 112 or any other suitable magnetic element in the magnetic field 110 results in a force being imparted on the magnetic component 112 due to electromagnetic interaction between the magnetic component 112 and the magnetic field 110. In particular, when a magnetic component (e.g., a permanent magnet, electromagnetic coil, electromagnet, magnetic material, or other magnetic element) is in or near a magnetic field, a resulting physical force is experienced by the magnetic component. The physical force may have any of various directions depending on factors such as the polarity of the magnetic component, the direction of the magnetic field, the orientation of the magnetic component, and the like.

As shown, the magnetic field 110 is an alternating magnetic field, which results in alternating forces being imparted on the magnetic component 112, thus vibrating or oscillating the stylus 104. An alternating magnetic field may be produced by energizing a coil with an alternating current. In other cases, the magnetic field 110 may be a pulsed magnetic field. For example, a coil may be cyclically or repeatedly energized and de-energized with direct current (e.g., a square wave or other periodic, non-sinusoidal signal). This may produce a pulsed force acting in a single direction, which may also be perceived as a vibration or oscillation. In yet other cases, the magnetic field 110 may be a constant magnetic field or otherwise configured to produce a non-oscillating force on the magnetic component 112, such as a force acting in a particular direction to help force or guide the stylus 104 in a particular direction. Such forces may be produced by energizing a coil with a continuous direct current signal. Haptic feedback like that shown in FIG. 1B may be produced in response to various inputs, operational states of the device 102, notifications, or the like, as described herein.

Figure 2A:
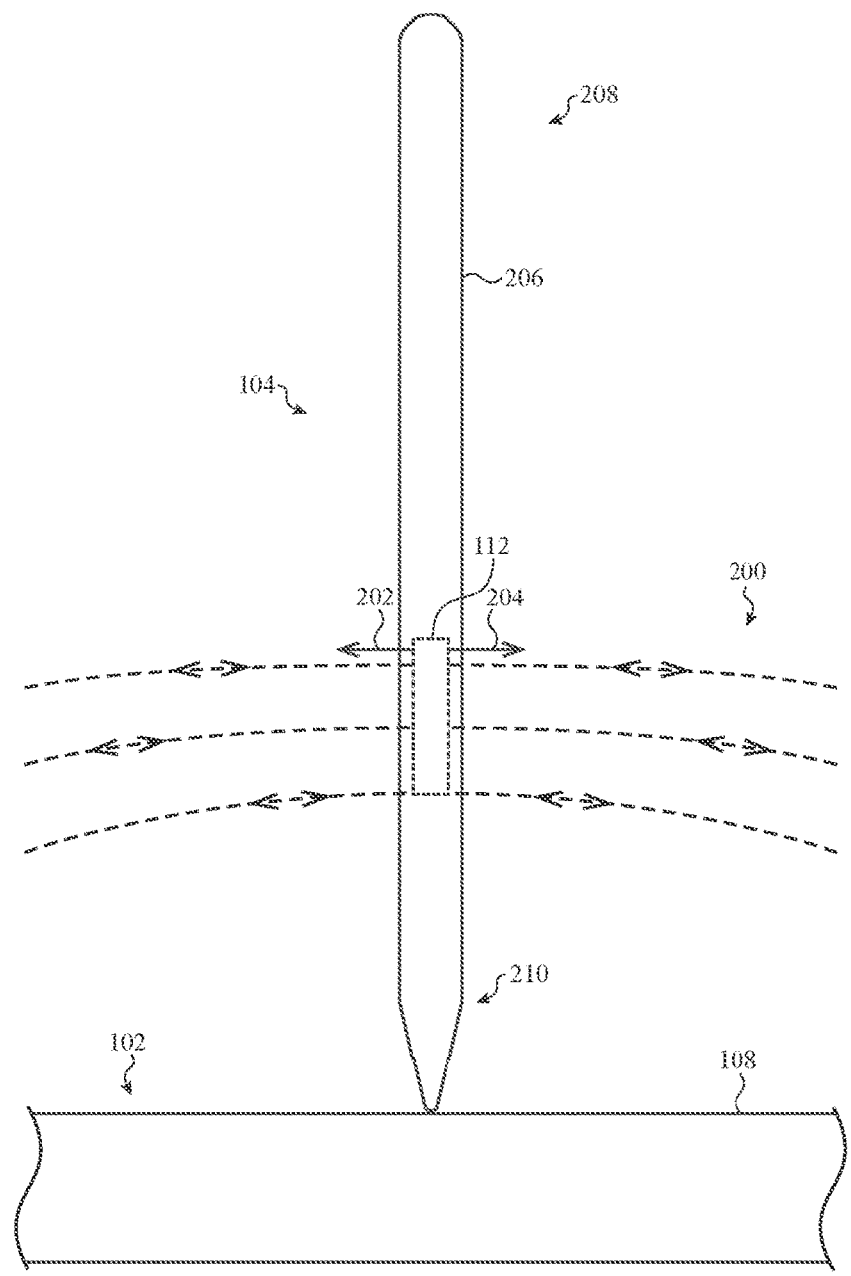
FIGS. 2A-2B depict partial views of the interface system of FIGS. 1A-1B.

FIG. 2A shows a side view of the interface system 100, showing the stylus 104 and a portion of the electronic device 102. As noted above, the stylus 104 may include a magnetic element, such as a magnetic component 112. The magnetic component 112 may be positioned anywhere along a body (e.g., the barrel 206) of the stylus 104. For example, the magnetic component 112 may be located at or near a point or tip 210 of the stylus 104, or at or near a top 208 of the stylus 104. The location of the magnetic component 112 in the stylus 104 may be selected or optimized based on one or more properties of the magnetic field to which the stylus 104 is subjected. For example, the strength of a magnetic field decreases with the cube of the distance from the magnetic field source. Accordingly, where a magnetic field generator or source (e.g., a coil) is located within the electronic device 102, as described herein, the magnetic field is stronger near the cover 108 of the electronic device 102. Accordingly, positioning the magnetic component 112 nearer to the tip 210 of the stylus 104 may result in greater forces than if the magnetic component 112 were positioned nearer the top 208 of the stylus 104, because the magnetic component 112 will be subjected to a stronger magnetic field.

However, positioning the magnetic component 112 nearer the top 208 of the stylus 104 may produce a greater torque on the stylus 104 when it is being held by a user. More particularly, the increased distance between a user's hand (which may generally grip the stylus 104 near the point or tip 210) and the magnetic component 112 may result in a more noticeable or perceptible tactile output for a given force. Accordingly, in some cases, the magnetic component 112 is positioned nearer the tip 210 of the stylus 104 in order to take advantage of the increased strength of the magnetic field near the cover 108, while in other cases the magnetic component 112 is positioned nearer the top 208 of the stylus 104 to take advantage of the increased amplitude of the tactile output.

Other positions and configurations of the magnetic component 112 or other magnetic element are also possible. For example, the magnetic component 112 may be substantially aligned with a center of mass of the stylus 104, or it may be offset from the center of mass. As another example, the magnetic component 112 may be substantially aligned with an expected or predicted grip location of the stylus 104, or it may be offset from the predicted grip location. As yet another example, all or a portion of the barrel 206 may be a magnet or a magnetic material (e.g., steel). In such cases, the magnetic component 112 may be integral with the barrel 206 or otherwise form a portion of the barrel 206.

The magnetic element (e.g., the magnetic component 112) may be coupled to the stylus 104 in any suitable way. For example, the magnetic component 112 may be rigidly coupled to the barrel 206 of the stylus 104. In such cases, electromagnetic forces acting on the magnetic component 112 due to the application of a magnetic field (e.g., the field 200) may be transferred directly to the barrel 206. As another example, the magnetic component 112 may be coupled to the barrel 206 of the stylus 104 via a compliant coupling, such as with springs, elastomeric materials, or other compliant members or materials. This configuration allows the magnetic component 112 to move relative to the barrel 206 while still imparting forces to the barrel 206 through the compliant coupling. In some cases, a compliant coupling for the magnetic component 112 acts as a resonant actuator that amplifies the haptic output experienced by a user for a given magnetic field. Examples of compliant couplings are described herein with respect to FIGS. 9A-9B.

FIG. 2A shows the interface system 100 in a configuration in which the stylus 104 is subjected to a magnetic field 200 that produces forces that are substantially parallel to the cover 108 of the electronic device 102 (or at least forces having a component that is parallel to the cover 108). For example, the magnetic field 200 may be substantially parallel to the cover 108, at least in the proximity of the stylus 104 and/or the magnetic component 112. Further, the magnetic component 112 may be configured and/or oriented such that a parallel magnetic field imparts a force that is substantially parallel to the cover 108, such as forces 202, 204. For example, the magnetic component 112 may be oriented within the body of the stylus 104 so that the polar alignment of the magnetic component 112 results in the parallel forces shown in FIG. 1B. As described herein, the magnetic field 200 may be produced by the electronic device 102, or by a magnetic field generator or other magnetic field source that is separate from the electronic device 102.

Forces that are parallel to a cover (or forces that have a parallel component), such as forces 202, 204, may be used to produce vibrating haptic outputs or directional forces. For example, where the magnetic field 200 is an oscillating or alternating magnetic field, the direction of the forces on the magnetic component 112 may alternate to produce a vibration. On the other hand, where the magnetic field 200 is a constant (or non-oscillating) field, the resulting force applied to the magnetic component 112 may tend to push or move the magnetic component 112 in a particular direction. Where directional forces are produced, the stylus 104 and/or the electronic device 102 may use positional feedback to determine parameters of the magnetic field being generated and how or whether to change the magnetic field. For example, as the stylus 104 moves relative to the cover 108, the properties of the magnetic field may need to be changed to maintain the directional force in the same direction. Similarly, if the directional force is intended to guide the stylus 104 along a non-linear path, the magnetic field (e.g., the direction, amplitude, etc.) may need to be changed as the stylus 104 moves along the cover 108.

Positional feedback may be provided by any suitable device, component, or technique. For example, the stylus 104 may include position and/or orientation sensors, accelerometers, gyroscopes, inertial position sensors, optical sensors, or the like. The stylus 104 may determine absolute or relative positional information and communicate that information to a device with a magnetic field source (e.g., the device 102 or any other suitable computing device). Additionally or alternatively, an electronic or computing device may include positional sensors, such as a touch and/or force sensor. As one example, where the electronic device 102 has a touch sensitive input surface, such as a touchscreen, the touch sensor may determine the position of the stylus 104 and use that positional information (optionally along with other information such as a target location or position) to determine the parameters of the magnetic field and/or how to vary the magnetic field to produce the desired forces.

Figure 2B:
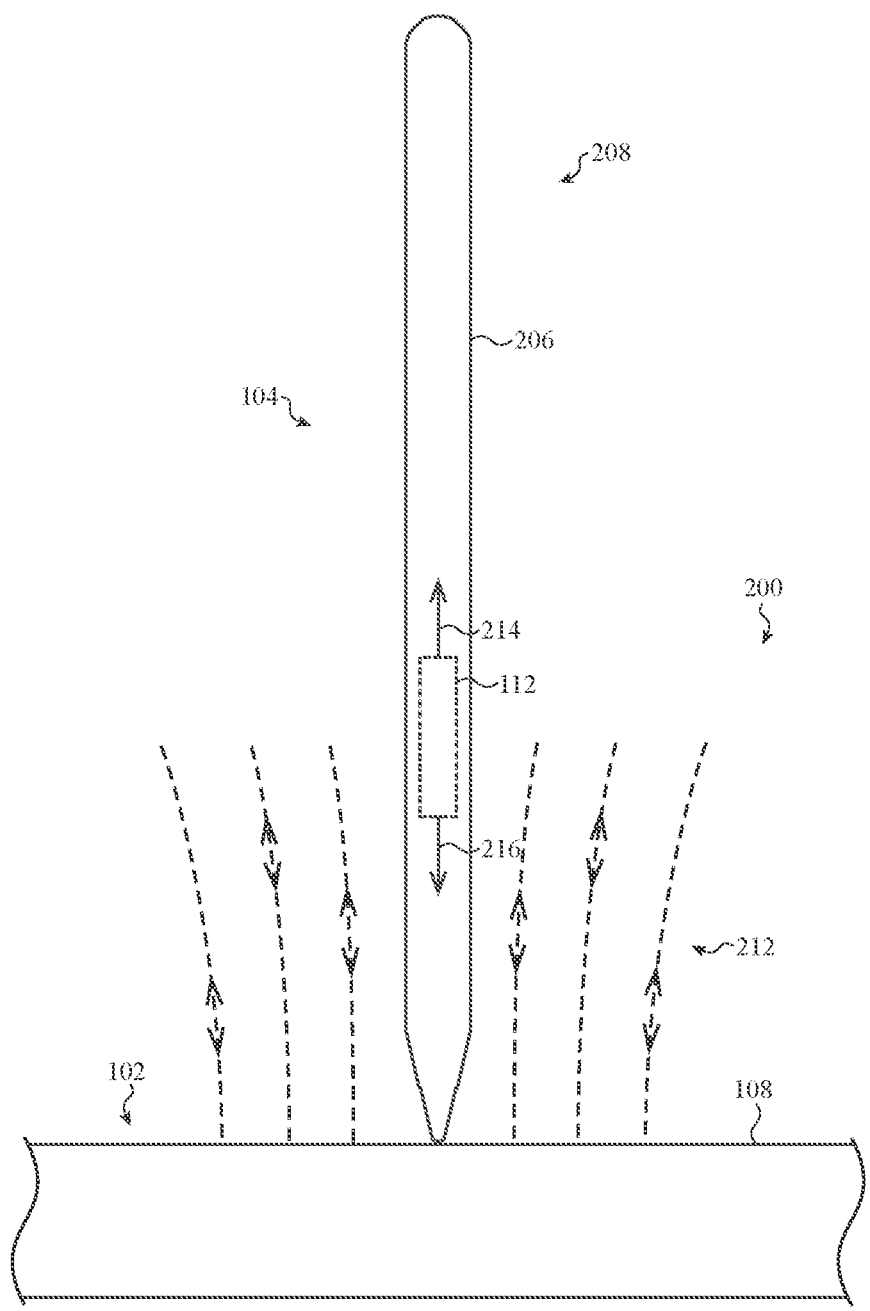

FIG. 2B shows a side view of the interface system 100 where the stylus 104 (or any other suitable input device) is subjected to a magnetic field 212 that produces forces that are substantially normal to the cover 108 (or otherwise have a component normal to the cover 108 that tends to attract the stylus 104 to or repel it from the cover 108). In contrast to the magnetic field 200, the magnetic field 212 is substantially perpendicular to the cover 108, and the magnetic component 112 is oriented so that when subjected to the magnetic field 212, a force tending to attract the magnetic component 112 to or repel it from the cover 108 is produced, such as forces 214, 216. Such forces may be used to change the perceived friction or texture of the cover 108. For example, by applying an attractive force (e.g., force 216), the force required to slide the stylus 104 across the cover 108 may be increased, while applying a repulsive force (e.g., force 214) may reduce the required force. Similarly, producing an oscillating force (e.g., cycling between an attractive force and a repulsive force or even no force) may reduce the force required to slide the stylus 104. This may result in a perception of a lower friction surface as compared to sliding the stylus 104 with the oscillating force. Such effects may be used in similar ways as other force-based or haptic outputs, such as to differentiate between input regions or icons, indicate when the stylus has deviated from a predicted or target path, to simulate different surface textures, or the like.

The magnetic fields 200, 212 and the magnetic component 112 in FIGS. 2A-2B may produce oscillating or continuous forces. For example, if the magnetic fields are alternating or oscillating, the resulting force on the magnetic component 112 may be an oscillating or vibrating force, resulting in a vibratory haptic output to the stylus 104. Where the magnetic fields are constant (or otherwise do not change in a cyclic, oscillating manner), the resulting force may be in a particular direction only, producing a force that may move or guide the stylus 104. As noted above, such haptic outputs may be used to provide information to a user, such as to indicate when a user has deviated from a suggested or predicted path, or to indicate the boundaries of input regions or icons or the like.

The magnetic component 112 or other magnetic element and the magnetic field source(s) associated with the interface system 100 may be configured to produce forces along only one plane or axis. For example, magnetic field generators may be configured to generate only magnetic fields that are substantially perpendicular to the cover 108, and the magnetic component 112 may be a permanent magnet with a polarity that produces forces on the stylus 104 that are substantially perpendicular to the cover 108 when subjected to the magnetic field. In this configuration, the interface system 100 may substantially only produce forces in one plane (though the force may be oscillating or constant, as described above).

On the other hand, the interface system 100 may be configured to produce forces along multiple planes or directions. For example, the magnetic field generators associated with the interface system 100 may be configured to produce magnetic fields with different orientations relative to the stylus 104. In this way, forces having different directions (e.g., parallel to the cover 108, perpendicular to the cover 108, or other suitable directions) may be produced. Alternatively or additionally, the magnetic component 112 may be manipulated or configured in real-time to produce forces in different directions. For example, the magnetic component 112 may be one or more electromagnets or coils that can be selectively activated to produce different forces (in magnitude or direction) for a given magnetic field, or it may be a movable permanent magnet, coil, or electromagnet that can be moved to produce different forces. As another example, the magnetic component 112 may be one or more programmable magnets such that the polarity of the programmable magnet(s) can be changed by subjecting the magnetic component 112 to a particular current or a magnetic field. Other magnetic components or elements are also possible. Where the magnetic component 112 includes an electromagnetic coil, such as when the magnetic component 112 is an electromagnet, the magnetic component 112 may produce secondary magnetic fields that interact with the magnetic fields produced by the magnetic field generators associated with the electronic device 102 to produce forces on the stylus 104.

FIGS. 3A-8C show various example configurations of magnetic field generators that may be used in an interface system that produces forces on an input device (e.g., a stylus) via external magnetic influence, such as the interface system 100. While some examples are shown incorporated directly into an electronic or computing device such as a tablet computer, and others are shown incorporated into accessories or external components, it will be understood that configurations other than those shown are also possible. For example, a magnetic field generator that shown incorporated directly into an electronic device may instead or additionally be incorporated into an accessory or other external component or peripheral.

Figure 3A:
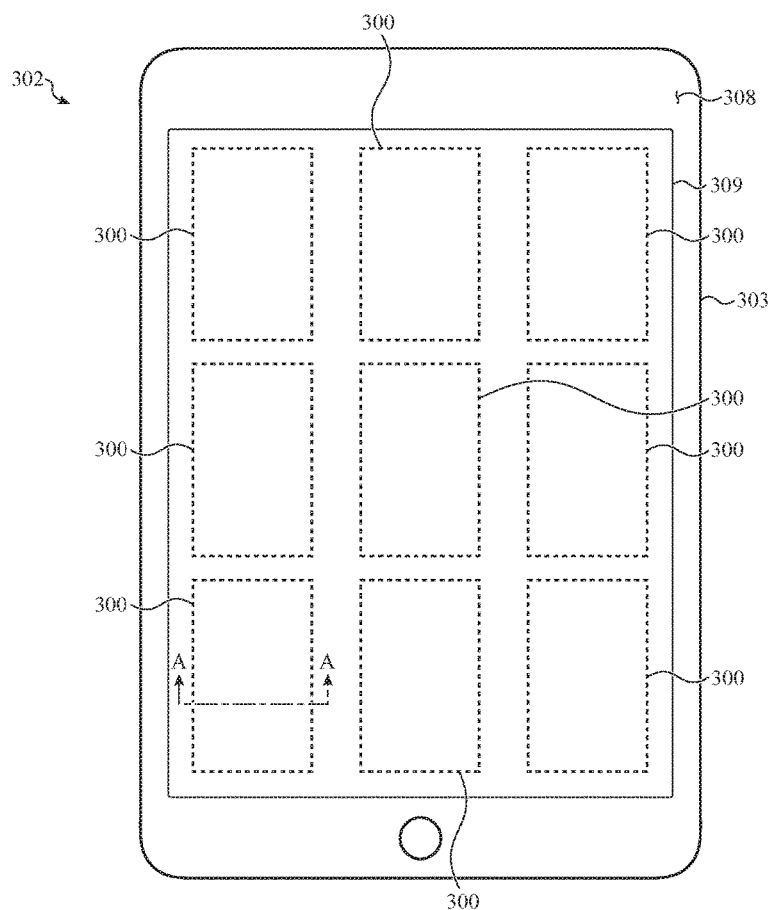
FIG. 3A depicts an example electronic device with conductive coils.

FIG. 3A shows an electronic device 302, which may be an embodiment of the electronic device 102 of FIG. 1A. The electronic device 302 includes conductive coils 300 within a housing 303 (e.g., similar to the housing 103, FIG. 1A) and under the input surface defined by the cover 308 (e.g., similar to the cover 108, FIG. 1A). As shown, there are nine coils 300, though more or fewer coils may be used. Moreover, the coils 300 are shown arranged in a regular pattern or grid arrangement in which the coils are separated from each other (e.g., they do not overlap). Other arrangements are also contemplated. For example, in some cases, all or some of the coils may overlap other coils. FIG. 3C shows an example in which the coils 300 are arranged in an overlapping configuration. By eliminating the gap between adjacent coils, the overlapping configuration shown in FIG. 3C may reduce or eliminate areas of no or weak magnetic fields, thus facilitating more uniform force and/or motion-based output from the stylus 104 over the input surface. To illustrate an example overlapping coil configuration, a first coil 300-1 is shown in a first dashed line, and a second coil 300-2 is shown in a second dashed line. The other coils 300 shown in FIG. 3C may overlap in a similar manner. Other overlapping configurations are also contemplated. For example, in some cases, coils only overlap in one direction (e.g., from left-to-right or from top-to-bottom).

Figure 3B:
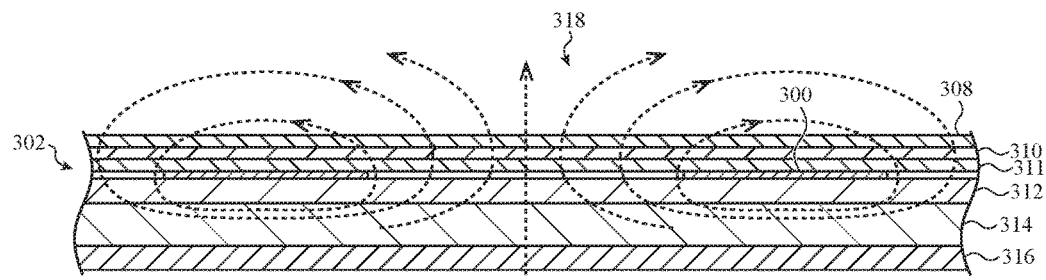
FIG. 3B depicts a partial cross-sectional view of the electronic device of FIG. 3A, viewed along line A-A in FIG. 3A.
Figure 3C:
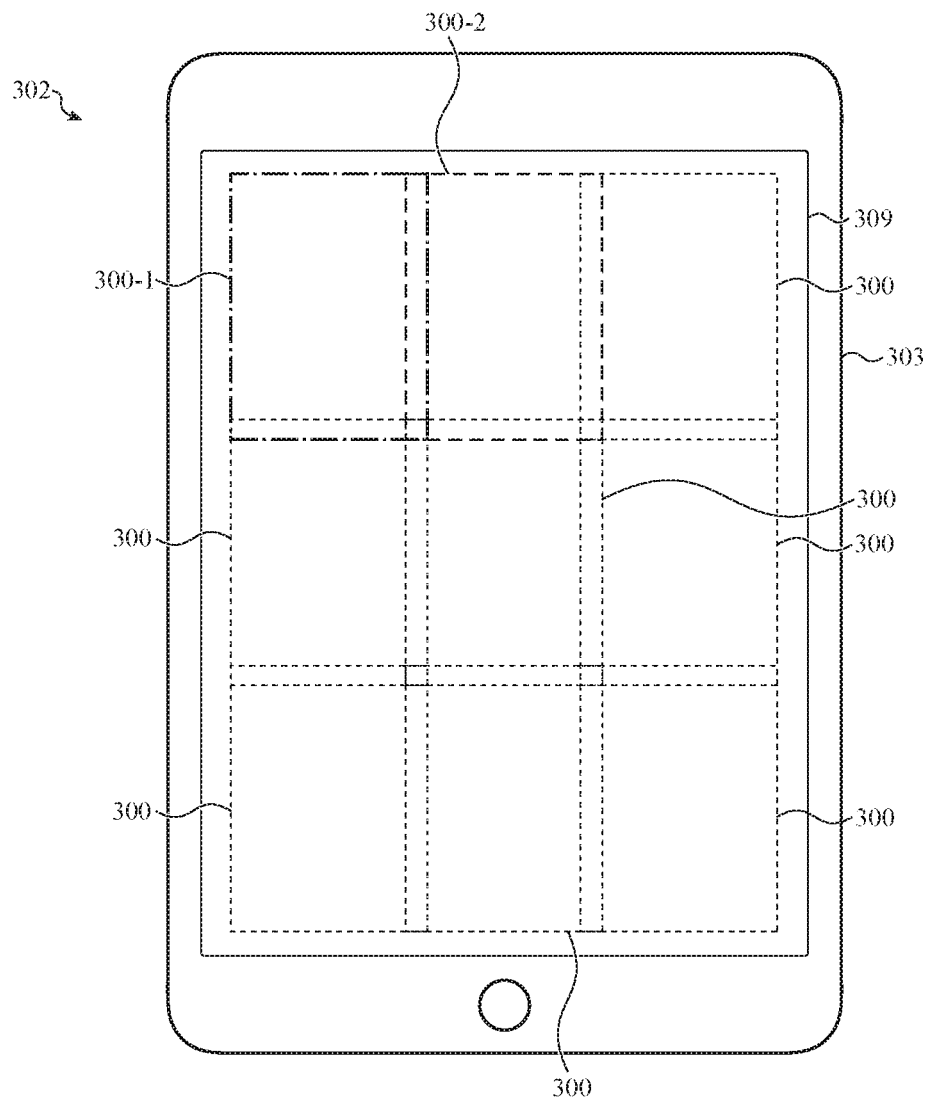
FIG. 3C depicts another example electronic device with conductive coils.

FIG. 3B is a cross-sectional view of an example configuration of the device 302. The device 302 includes the cover 308, which may be formed from or include any suitable material, such as glass, plastic, polycarbonate, sapphire, or the like. As noted above, the cover 308 may define an exterior surface (e.g., an input surface) of the device 302.

Below the cover 308 is a touch sensor 310. The touch sensor 310 may use any suitable type of touch-sensing technology or techniques, such as capacitive touch sensing, resistive touch sensing, optical touch sensing, or the like. While the touch sensor 310 is shown as a single layer, the touch sensor 310 may include multiple layers, such as one or more electrode layers (e.g., sense and/or drive layers) to sense touch inputs applied to the cover 308. The touch sensor 310 may be integrated with, or applied on, the cover 308. For example, a first electrode layer of the touch sensor 310 may be applied to a bottom surface of the cover 308, and a second electrode layer of the touch sensor 310 may be applied to a bottom surface of the first electrode layer. Where the cover 308 is a laminate structure, electrode layers of the touch sensor 310 may be interleaved with layers of the cover 308.

Touch inputs that are sensed by the touch sensor 310 may include taps, clicks, swipes, gestures, or other inputs provided by fingers, a stylus (e.g., the stylus 104), or other objects, implements, or input devices. In some cases, such as where the electronic device 302 includes a display, the touch sensor 310 is substantially transparent or otherwise optically transmissive. In some cases, the touch sensor 310 is or includes a force sensor or force sensing capabilities to determine an amount of force of a touch input.

The electronic device 302 may also include a display 311. The display 311 may use any suitable display technology, as described above, and may include various layers or components. For example, the display 311 may include polarizing sheets, light guide sheets, thin-film transistor layers, OLED layers, LCD layers, or the like. These sheets are not shown separately in FIG. 3B, but are represented by the display 311. Together, the display 311 and the touch sensor 310 may form a touchscreen display, with the cover 308 defining an input surface of the touchscreen display (which may be an exterior surface of the electronic device 302).

The electronic device 302 also includes a substrate 312 on which the coils 300 may be positioned. The substrate 312 may be any suitable substrate, such as a circuit board, flexible circuit material, Mylar, or the like. The conductive coils 300 may be coupled to or otherwise incorporated with the substrate 312 in any suitable way. For example, the coils 300 may be wires (e.g., copper, silver, gold, or other metal wires) that are adhered to or encapsulated in the substrate 312. As another example, the coils 300 may be traces of conductive material that are deposited on or otherwise incorporated with the substrate 312. For example, the coils 300 may be indium tin oxide (ITO), metal nanowire, or another conductive material that is formed onto the substrate 312. The coils 300 may have any suitable dimensions, conductor sizes and shapes, and number of turns to produce a desired magnetic field.

As shown in FIG. 3C, the coils 300 are positioned below display 311. Accordingly, the coils 300 and the substrate 312 do not need to be transparent, as light and images do not need to pass through the coils 300 and substrate 312. In such configurations, the coils 300 may be formed from opaque materials, such solid metal (e.g., copper, aluminum) wires. Moreover, where the coils 300 are below the display 311, the thinness of the coils 300 may be less critical, as the height of the coils 300 will not affect the distance between the display 311 and the cover 308. Thus, larger (e.g., thicker) coils 300 having more wire turns may be used when the coils 300 are positioned below the display. Such configurations may result in or enable stronger magnetic fields than may be possible with coils formed of transparent conductors disposed above the display 311.

In other examples, the coils 300 and the substrate 312 may be formed from transparent or optically transmissive materials, and may be positioned above the display 311. This configuration positions the coils closer to the cover 308, which may result in stronger magnetic fields above the cover 308. Moreover, where the display 311 is between the coils 300 and the cover 308, the display may shield, weaken, or change the shape of magnetic fields produced by the coils 300. Accordingly, positioning the coils above the display 311 (so that the display 311 is not between the coils 300 and the cover 308) may reduce or eliminate negative effects of the display 311 on the magnetic fields produced by the coils 300.

The electronic device 302 may also include a magnetic shunt 314 positioned under the coils 300. The magnetic shunt 314 may guide or direct part of a magnetic field 318 produced by the coils 300 through the shunt 314. This may help prevent leakage of the magnetic field 318 through a back of the device 302 (e.g., a back surface of the housing 303 or another enclosure), and may also increase the strength of the magnetic field 318 above the cover 308 (as compared to an embodiment without the shunt 314). The magnetic shunt 314 may be formed from or include any suitable material, such as a ferritic or magnetic metal (e.g., steel, iron, etc.). (The magnetic field 318 shown in FIG. 3B is merely for illustration, and is not necessarily indicative or representative of an actual magnetic field produced by the coils 300.)

Layer 316 may correspond to a back housing of the device 302 (e.g., a back member of the housing 303 or another enclosure). In some cases, the layer 316, may be formed from or include a ferritic material. In such cases, the layer 316 (e.g., a portion of the housing 303 that defines an exterior surface of the housing 303) may act as a magnetic shunt, and the separate magnetic shunt 314 may be omitted. In some cases, no magnetic shunt is included.

Other components may also be present in the electronic device 302 shown in FIG. 3B. For example, processors, batteries, housing components, support structures, force sensors, and the like all may be included in the device 302. Such components may be incorporated into any suitable position in the stack shown in FIG. 3B. Moreover, some of the components shown in FIG. 3B may be omitted from an electronic device that is used in an interface system as described herein. For example, where the interface system is part of a trackpad or drawing tablet, the display 311 may be omitted.

Figure 4A:
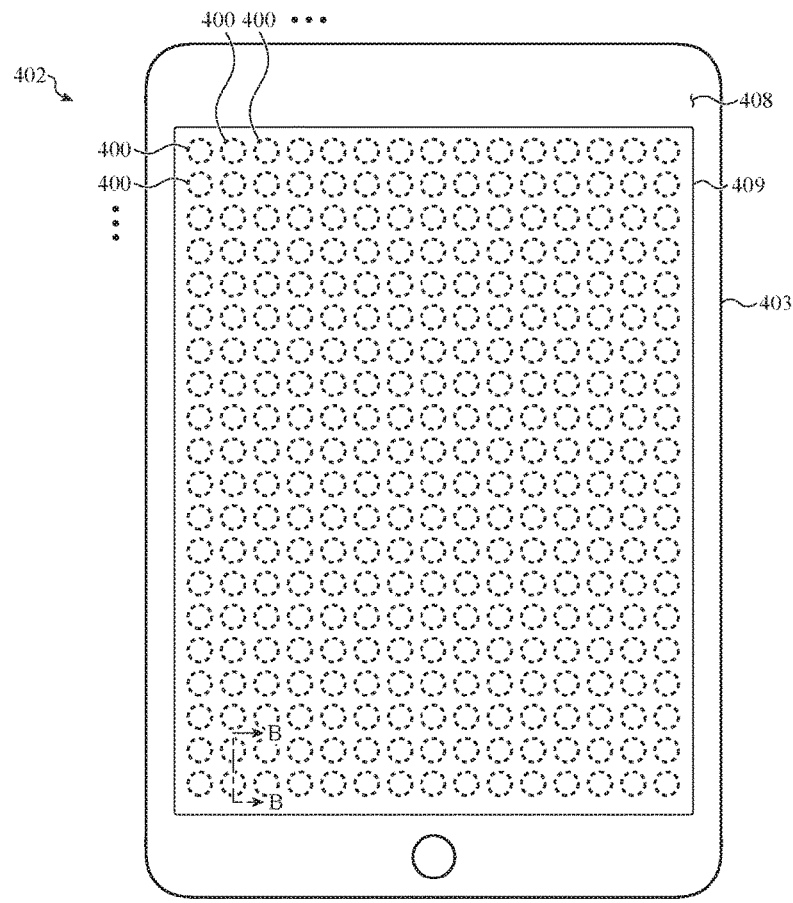
FIG. 4A depicts another example electronic device with conductive coils.

FIG. 4A shows an electronic device 402, which may be an embodiment of the electronic device 102 of FIG. 1A. The electronic device 402 includes conductive coils 400 within a housing 403 (e.g., similar to the housing 103, FIG. 1A) and under the input surface defined by the cover 408 (e.g., similar to the cover 108, FIG. 1A). More or fewer coils 400 than those shown may be used. Moreover, the coils 400 are shown arranged in a regular pattern or grid arrangement, though other arrangements are also contemplated. For example, in some cases, all or some of the coils may overlap other coils (similar to the arrangement shown in FIG. 3C). By reducing the size of each coil 400 and including more coils (as compared to the configuration shown in FIG. 3A), greater control may be exerted over the forces imparted to the magnetic component 112 in the stylus 104. For example, by selectively activating multiple coils 400, different magnetic field configurations may be produced. Moreover, forces that tend to move or guide the stylus (e.g., forces parallel to the cover 108, such as those in FIG. 2A) may be more accurately produced than with larger or more sparsely placed coils.

Figure 4B:
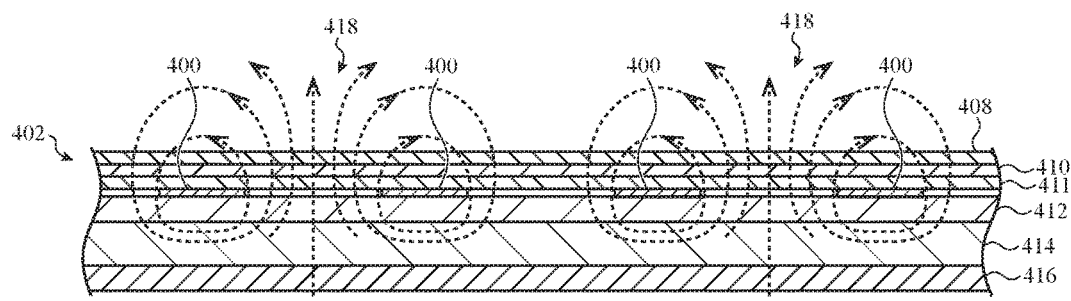
FIG. 4B depicts a partial cross-sectional view of the electronic device of FIG. 4A, viewed along line B-B in FIG. 4A.

FIG. 4B is a cross-sectional view of an example configuration of the device 402. The device 402 may include a cover 408, a touch sensor 410, a display 411, a substrate 412 on which the coils 400 may be positioned, a magnetic shunt 414 positioned under the coils 400, and a layer 416 corresponding to a back of the housing 403. These components may have the same structure, function, materials, etc., as the corresponding components described above with respect to FIG. 3B. FIG. 4B also shows example magnetic fields 418 that may be produced by the coils 400.

In some cases, instead of conductive coils 400 (e.g., conductive traces or wires in a coil configuration), the device 402 may include selectively magnetizable materials or components (e.g., programmable magnets). For example, the device 402 may include materials that can be selectively magnetized and/or demagnetized in real-time, as well as circuitry and components to perform the selective magnetization and/or demagnetization. Accordingly, the device 402 can change the magnetic fields above the cover 408 by changing the polarity, direction/orientation, or strength of the magnetizable materials (including possibly completely removing the magnetic field of any particular magnetizable element).

Figure 5:
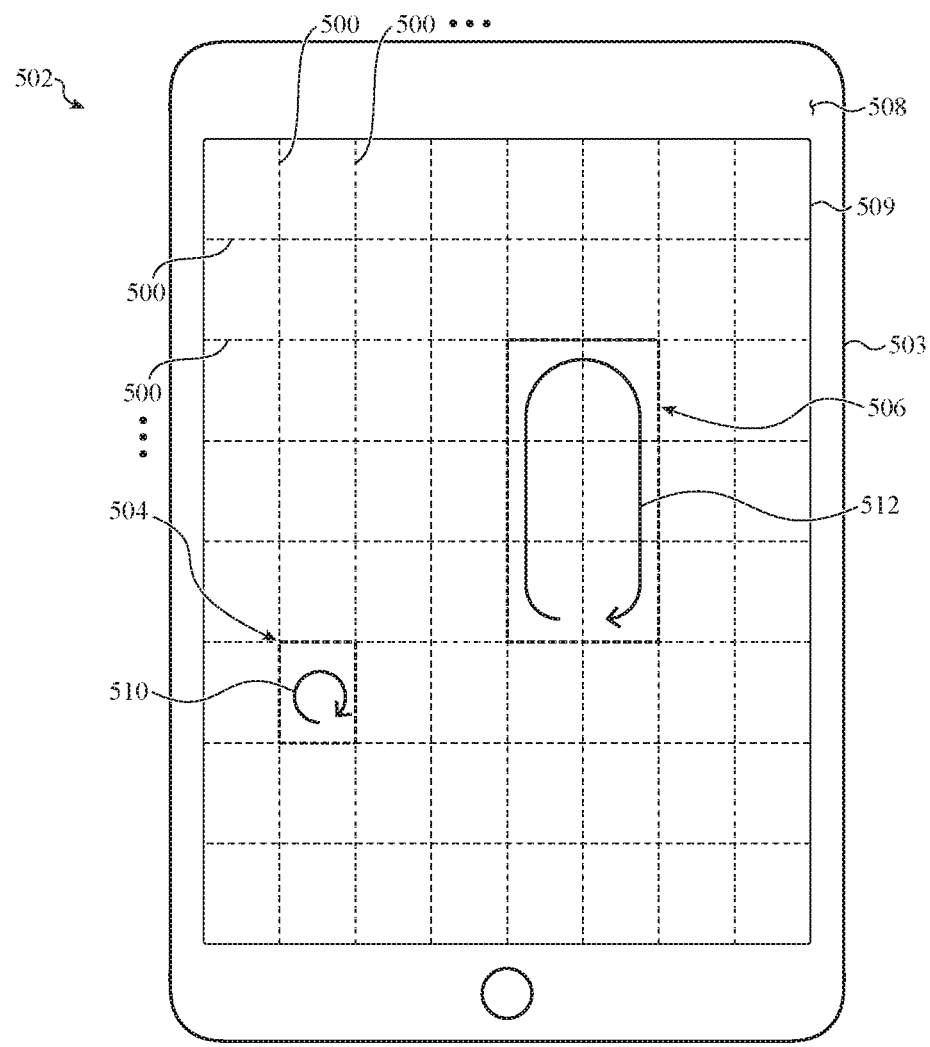
FIG. 5 depicts an example electronic device with conductive traces.

FIG. 5 shows an electronic device 502, which may be an embodiment of the electronic device 102 of FIG. 1A. The electronic device 502 may include a housing 503 (e.g., similar to the housing 103, FIG. 1A) and a cover 508 (e.g., similar to the cover 108, FIG. 1A) defining an input surface.

Instead of discrete conducive coils under the cover 508, as shown in FIGS. 3A-4B, the device 502 includes conductive traces 500 arranged in a grid pattern (though other patterns are also contemplated). Each conductive trace 500 (and/or the junctions between overlapping conductive traces 500) may be individually coupled to switching circuitry so that portions of the traces 500 may be selectively operated as coils. For example, as shown in FIG. 5, certain traces 500 may be selectively joined and powered to operate a particular cell 504 as a coil. For example, a current 510 may be passed through the conductive traces 500 that define the cell 504 to produce a magnetic field. When the cell 504 is being operated as a coil, it may act substantially the same as or similar to the conductive coils 300, 400 described above (e.g., it may produce magnetic fields the same or similar to those shown above). In addition, while the cell 504 is made up of the smallest grid square formed by the conductive traces 500, larger cells, such as the cell 506, may also be activated to produce a magnetic field. Thus, a current 512 may be passed through the conductive traces 500 that define the cell 506 to produce a magnetic field. Cells of different shapes may also be produced, such as the square cell 504 or the rectangular cell 506. Moreover, multiple cells may be active simultaneously, thus allowing the production of a wide range of overlapping and interacting magnetic fields.

The conductive traces 500 may include any suitable material and may be formed in any suitable way. For example, the conductive traces 500 may be layers of ITO, metal nanowire, or other conductive materials patterned or otherwise formed on a substrate (e.g., a flexible circuit substrate material, a cover such as the cover 108, or any other suitable substrate). Where the conductive traces 500 are formed of ITO, nanowire, or another light transmissive conductor, the conductive traces 500 may be patterned on a light transmissive substrate and may be positioned above a display (e.g., above the displays 311, 411 in FIGS. 3B, 4B). This may place the coils closer to the cover of the electronic device, which may result in stronger magnetic fields above the cover. Moreover, placing the coils above a display may reduce or eliminate As another example, where conductive traces 500 are not light transmissive or transparent, such as when they are continuous metal traces, they may be positioned below a display (as described with respect to FIGS. 3B and 4B). Further, if the conductive traces 500 are positioned below a display, they may be larger than and/or may include more material than if they are above a display. For example, the traces 500 may be thicker, may have more material, or there may be more traces than would be practical if the traces 500 were above a display.

Figure 6A:
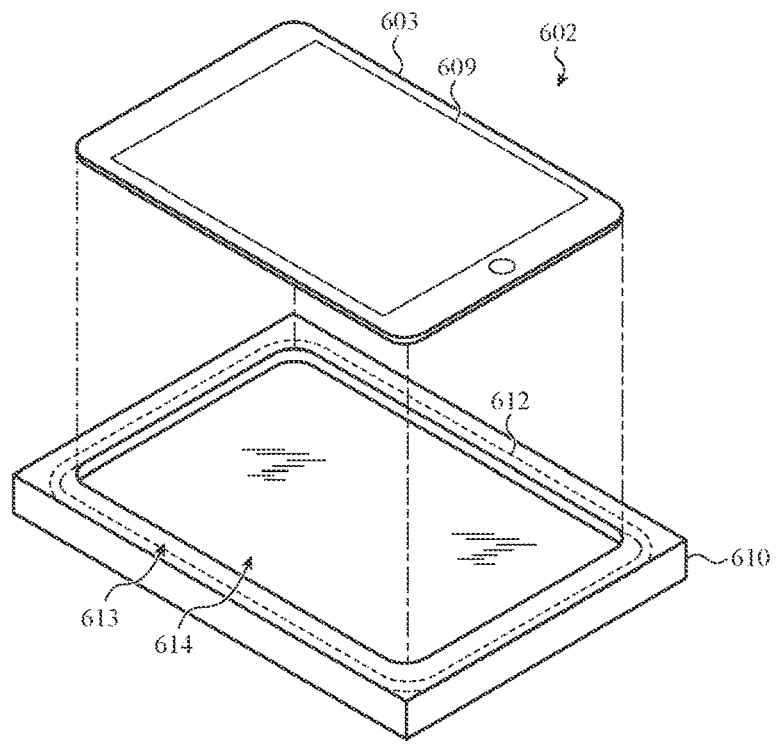
FIGS. 6A-6B depict an example interface system with conductive coils in a dock accessory.
Figure 6B:
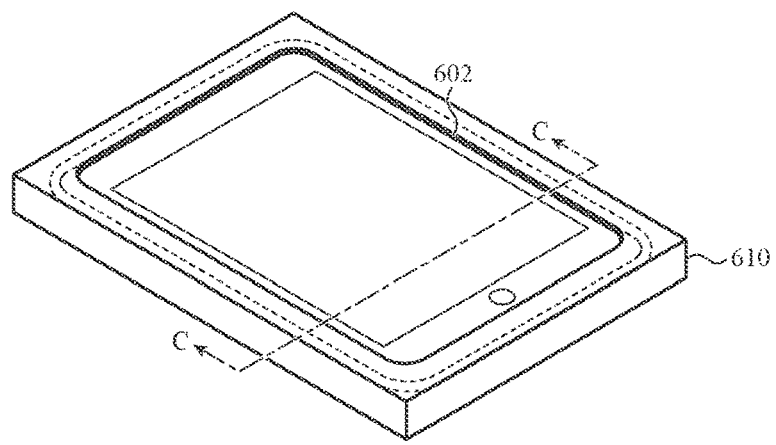
Figure 6C:
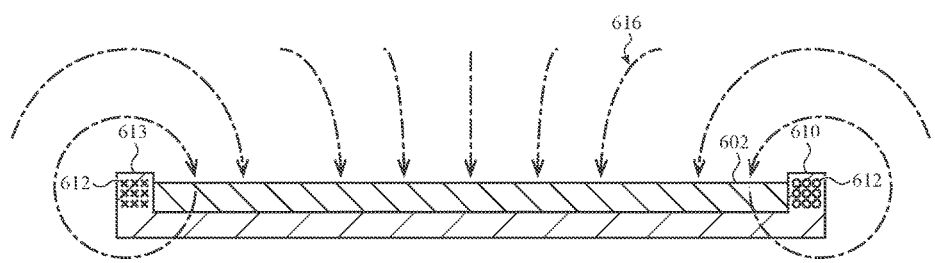
FIG. 6C depicts a partial cross-sectional view of the interface system of FIGS. 6A-6B, viewed along line C-C in FIG. 6B.

FIGS. 6A-6C show an electronic device 602, which may be an embodiment of the electronic device 102 of FIG. 1A, along with an accessory case or dock 610 that may be part of an interface system that produces forces, motions, and/or haptic outputs, as described herein. FIG. 6A shows the electronic device 602 separate from the dock 610, and FIG. 6B shows the electronic device 602 coupled to (e.g., docked with) the dock 610.

The electronic device includes a housing 603 and a display 609, which may be the same or similar to the housing 103 and display 109 of FIG. 1A. The dock 610 may define a recess 614 that may receive the electronic device 602 therein. The electronic device 602 and the dock 610 may communicate with each other via any suitable wired or wireless communication technique, including physical connectors, Bluetooth, Wi-Fi, or the like.

The dock 610 may include a magnetic field source in the form of a coil 612. The coil 612 may be positioned in a frame 613 of the dock 610 that surrounds or frames the electronic device 602. The coil 612 may be used to generate magnetic fields above or near the display 609 in order to produce force outputs via an input device (e.g., a stylus). The dock 610 may also include other components, such as power sources (e.g., batteries, capacitors, external power adapters), processors, communication circuitry, and the like, for powering the coil 612 and communicating with the electronic device 602. For example, the electronic device 602 may determine when a force or haptic output is to be provided, as well as parameters of the force or haptic output (e.g., whether the output should be a vibration or a directional force, the duration of the output, the location of the input device, etc.), and provide that information to the dock 610. In response to receiving the information, the dock 610 may energize the coil 612 to produce a magnetic field that will produce the requested output.

FIG. 6C is a cross-sectional view of the electronic device 602 and the dock 610, viewed along line C-C in FIG. 6B. The electronic device 602 is represented as a single component, though it will be understood that the electronic device 602 may include numerous components that are omitted from FIG. 6C for clarity. Such components may include, for example, processors, batteries, displays, touch sensors, force sensors, memory, and the like.

As shown in FIG. 6C, the coil 612 may be incorporated into the frame 613 of the dock 610. The coil 612 may have more or fewer turns than shown in FIG. 6C. Moreover, while the coil 612 is depicted as a number of wire turns, the coil may be other materials or have other configurations, such as conductive traces applied to a substrate.

The coil 612 may be encapsulated in the material of the frame 613, or it may be incorporated in any other manner. The frame 613 and the coil 612 may extend at least partially beyond (e.g., above) the input surface of the electronic device 602, as illustrated in FIG. 6C. This may help position a magnetic field 616 produced by the coil 612 in a more advantageous position relative to an input device (e.g., a stylus). More particularly, by placing the coil 612 further towards and/or above the input surface, the center of the coil 612, where the magnetic field may be the strongest or the most concentrated, may be nearer the magnetic component 112 of the stylus 104. In other cases, the frame 613 is substantially flush with or recessed with respect to the input surface of the electronic device 602. (In some cases, the coil 612 may be incorporated into the electronic device 602 directly, rather than a separate dock 610.)

Figure 7A:
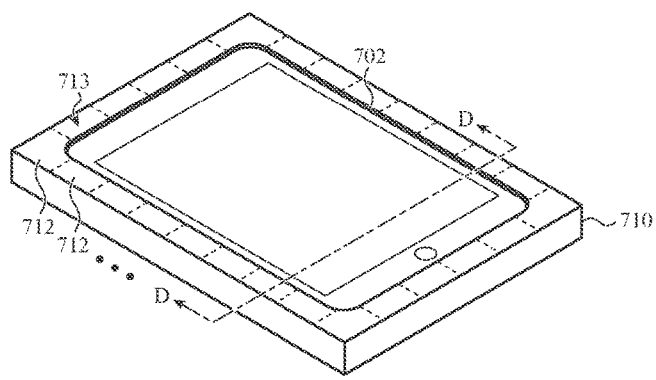
FIG. 7A depicts another example interface system with conductive coils in a dock accessory.
Figure 7B:
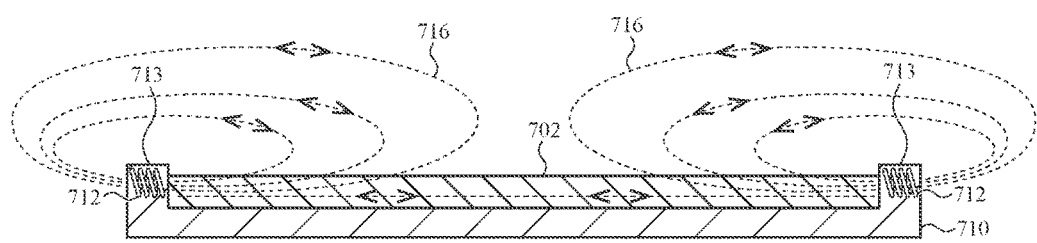
FIG. 7B depicts a partial cross-sectional view of the interface system of FIG. 7A, viewed along line D-D in FIG. 7A.

FIGS. 7A-7B show another example electronic device 702 and dock 710. FIG. 7A shows the electronic device 702 coupled to (e.g., docked in) the dock 710, and FIG. 7B is a cross-sectional view of the device 702 and dock 710 viewed along line D-D in FIG. 7A. The electronic device 702 may be an embodiment of the electronic device 102 in FIG. 1A.

The dock 710 may be similar to the dock 610 in FIGS. 6A-6C, but with a different coil configuration. In particular, instead of a continuous coil that surrounds or frames the electronic device 702, the dock 710 includes a plurality of coils 712 arranged around and/or defining a frame 713 of the dock 710. The coils 712 may be helical coils, as shown, or they may have any other suitable shape or configuration, such as flat coils.

As shown in FIG. 7B, the coils 712 may be oriented so that the longitudinal axes of the coils 712 are substantially parallel with an input surface of the electronic device 702. This may produce magnetic fields having a different orientation relative to the input surface than the coil 612 in FIGS. 6A-6C. For example, while the magnetic field 616 produced by the coil 612 may be substantially perpendicular to the input surface (at least in a central portion of the display of the device 602), the magnetic fields 716 produced by the coils 712 may be substantially parallel to the input surface of the device 702. In some cases, the coils 712 may be oriented so that the longitudinal axes are not parallel with the input surface of the device 702. Moreover, the coils 712 in a particular dock 710 need not have a uniform orientation. For example, some coils 712 may be parallel to the input surface while others may be perpendicular to the input surface, while others may be oriented at other angles. By combining differently oriented coils, different forces, motions, or haptic outputs may be produced by the dock 710. For example, some coils may be used to produce vibratory outputs, while others may be used to produce directional forces.

In some cases, a dock may include both an array of coils, as shown in FIGS. 7A-7B, as well as an encircling coil, as shown in FIGS. 6A-6C. This arrangement may also enable a dock to produce various different force and/or motion-based outputs. For example, an encircling coil (e.g., the coil 612) may be used to produce vibratory outputs, while the coils of a coil array (e.g., the coils 712) may be used to produce directional forces.

Returning to FIGS. 7A-7B, the coils 712 may provide power savings relative to a larger single coil such as the coil 612. For example, the coils 712 may provide smaller, more localized magnetic fields. If the location of the stylus is known, for example by a touch sensor of the device, the dock 710 can energize only the coil (or coils) that are closest to the stylus at that time. Accordingly, a force output may be produced using less power than a single large coil.

Figure 8A:
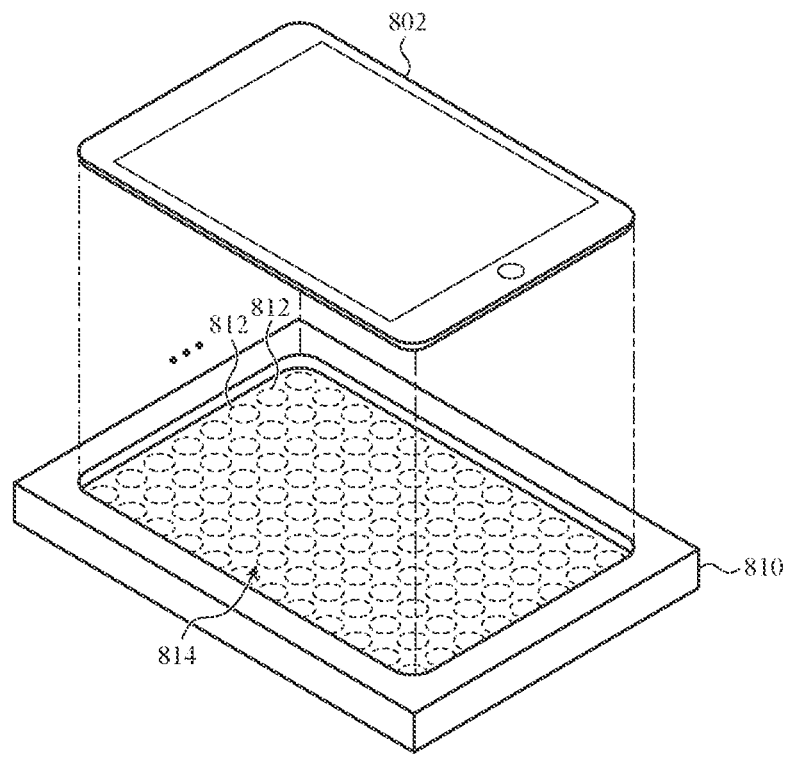
FIGS. 8A-8B depict another example interface system with conductive coils in a dock accessory.
Figure 8B:
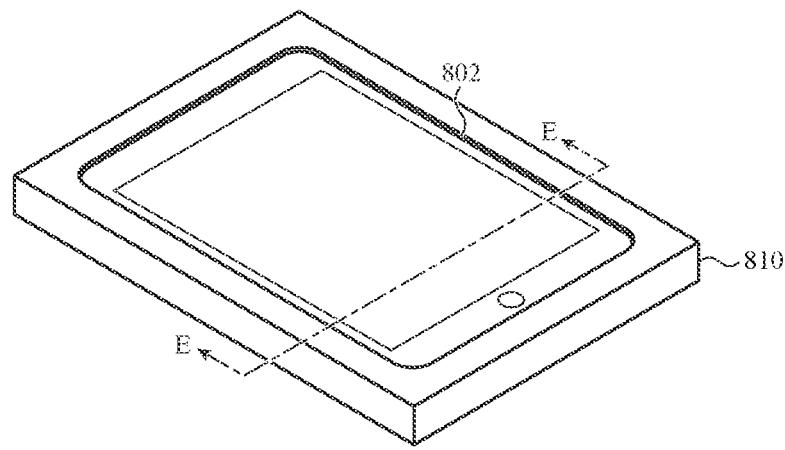
Figure 8C:
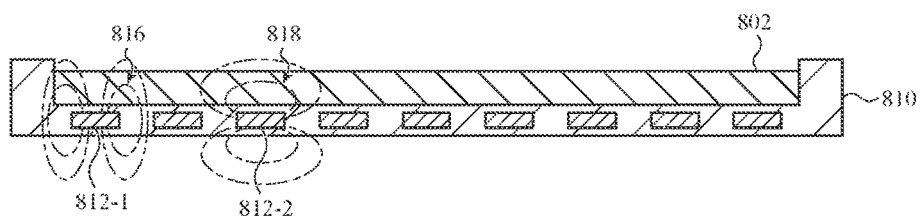
FIG. 8C depicts a partial cross-sectional view of the interface system of FIGS. 8A-8B, viewed along line E-E in FIG. 8B.

FIGS. 8A-8C show another example electronic device 802 and dock 810. FIG. 8A shows the electronic device 802 separate from the dock 810, and FIG. 8B shows the electronic device 802 coupled to (e.g., docked in) the dock 810. FIG. 8C is a cross-sectional view of the device 802 and dock 810 viewed along line E-E in FIG. 8B. The electronic device 802 may be an embodiment of the electronic device 102 in FIG. 1A.

The dock 810 may include an array of coils 812 embedded in or otherwise incorporated in a back wall 814 of the dock 810. The coils 812 may be similar to the coils 400 in FIGS. 4A-4B. For example, the coils 812 may be electromagnetic coils that are individually controllable to produce magnetic fields above or proximate an input surface of the device 802 when the device 802 is docked.

The coils 812 may be oriented in any suitable way to produce desired magnetic fields. For example, the coils 812 may be oriented so that the magnetic field lines are substantially perpendicular to the input surface, as illustrated in FIG. 8C by the coil 812-1 and the associated magnetic field 816. As another example, the coils 812 may be oriented so that the magnetic fields are substantially parallel to the input surface, as illustrated in FIG. 8C by the coil 812-2 and the associated magnetic field 818. As noted above, the coils 812 may all be oriented in the same direction, or they may have different directions (e.g., some may be parallel and some may be perpendicular). Other coil orientations (e.g., oblique angles) and combinations of differently oriented coils are also contemplated.

The dock 810 may include a magnetic shunt (e.g., a steel or ferritic layer) below the coils 812. The magnetic shunt may have the same effect as the shunt 314 discussed above. Also, where a dock positions magnetic field sources (e.g., coils 812) below the electronic device 802, the device 802 may be substantially transparent to magnetic fields, such that the magnetic fields extend through the device 802 to reach a stylus being used on an input surface of the device 802.

Figures 9A, 9B:
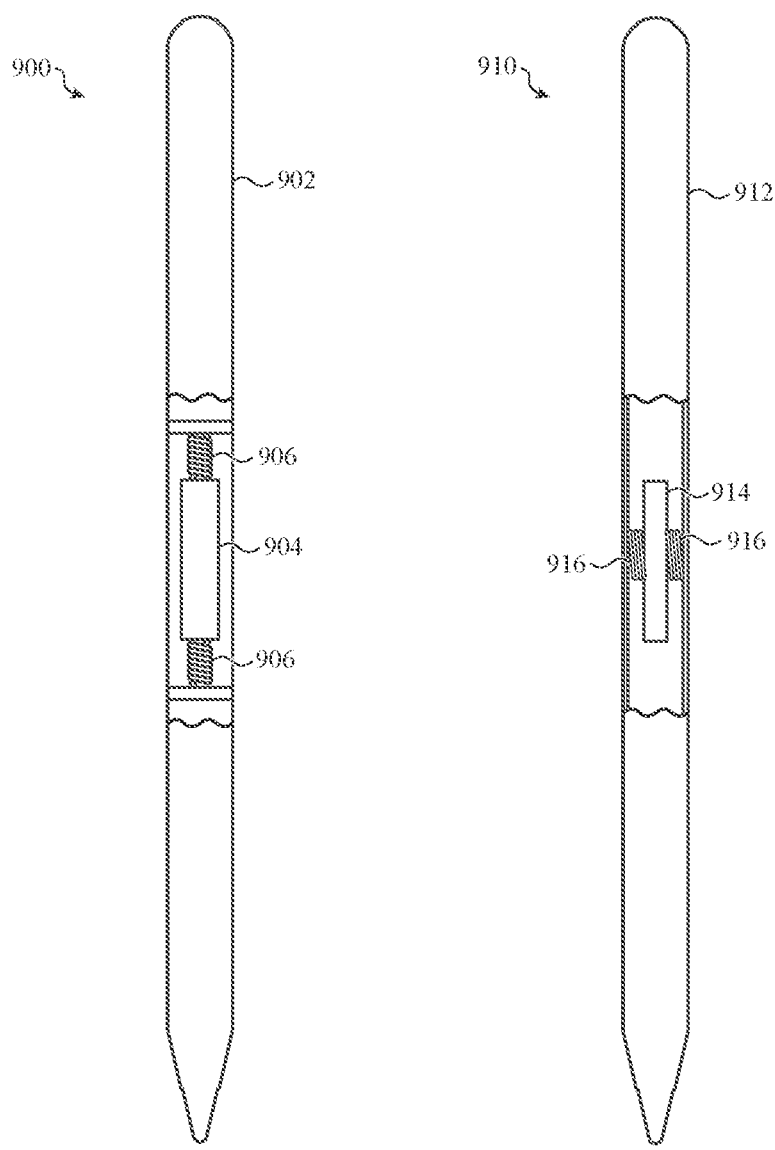
FIGS. 9A-9B depict partial cutaway views of example styluses.

FIGS. 9A-9B show example input devices that include spring-mounted magnetic components or elements. The spring-mounted magnetic components may enhance the effect of electromagnetic forces that are imparted to the magnetic component by acting as externally driven resonant actuators. More particularly, when a spring-mounted magnetic component is subjected to a magnetic field, the magnetic component may move relative to the barrel of the input device. The springs and the magnetic component may be tuned to have a resonant or harmonic frequency that amplifies the motion of the magnetic component when subjected to a magnetic field. The magnetic components shown in FIGS. 9A-9B may be used to produce oscillating or vibratory outputs as well as other force and/or motion-based outputs such as directional forces, attractive or repulsive forces, or the like.

FIG. 9A shows a partial cut-away view of a stylus 900. The stylus 900 includes a barrel 902 and a magnetic component 904 within the barrel 902. As shown in FIG. 9A, a portion of the barrel 902 is cut away to show the magnetic component 904. The magnetic component 904 may be a permanent magnet, a magnetic material (e.g., steel), an electromagnetic coil, or an electromagnet. The magnetic component 904 may be coupled to the stylus 900 via one or more springs 906 that movably support the magnetic component 904 relative to the barrel 902. The springs 906 may be any suitable type of spring or material that acts as a spring, such as coil springs, leaf springs, flat springs, elastomeric materials, or the like. The particular arrangement of springs 906 shown in FIG. 9A is merely one example configuration. In some cases, more or fewer springs may be used, and they may be coupled to the stylus 900 and/or the magnetic component 904 differently.

The magnetic component 904 is coupled to the stylus 900 via the springs 906 such that a primary direction of motion of the magnetic component 904 is aligned with (e.g., parallel to or coaxial with) a longitudinal axis of the stylus 900. In some cases, the magnetic component 904 may be constrained in other directions so that it only moves substantially parallel to the longitudinal axis of the stylus 900. In other cases, it is allowed to move parallel to the longitudinal axis as well as oblique or perpendicular to the longitudinal axis.

FIG. 9B shows a partial cut-away view of a stylus 910. The stylus 910 includes a barrel 912 and a magnetic component 914 within the barrel 912. As shown in FIG. 9B, a portion of the barrel 912 is cut away to show the magnetic component 914. The magnetic component 914 may be a permanent magnet, a magnetic material (e.g., steel), a conductive coil, or an electromagnet. The magnetic component 914 may be coupled to the stylus 910 via one or more springs 916 that movably support the magnetic component 914 relative to the barrel 912. The springs 916 may be any suitable type of spring or material (e.g., coil springs, leaf springs, flat springs, elastomeric materials, or the like). In contrast to the stylus 900, the magnetic component 914 in the stylus 910 has a primary direction of motion that is perpendicular to the longitudinal axis of the stylus 910. This may produce a different physical response than the configuration in FIG. 9A. For example, motion that is perpendicular to the longitudinal axis of a barrel (FIG. 9B) may produce more noticeable vibratory output to the hand of a user, while motion that is parallel to the longitudinal axis (FIG. 9A) may be more effective at simulating different surface textures on a cover of an electronic device.

Either of configurations shown in FIGS. 9A-9B may be tuned to have a resonant frequency within a particular frequency range. For example, certain vibration or oscillation frequencies may be particularly noticeable to a human hand. Accordingly, the parameters of the springs 906, 916 (e.g., spring rate, size, length, etc.) and the magnetic components 904, 914 (e.g., weight, size, shape, spring mounting locations, etc.) may be selected so that the magnetic components have a resonant frequency within the desired range. In some cases, the resonant frequency is between about 150 Hz and about 250 Hz. Other resonant frequencies are also contemplated.

In some cases, a stylus may include multiple spring-mounted magnetic components or elements, or a mixture of spring-mounted and rigidly mounted magnetic components or elements. As one example, a stylus may have two spring-mounted magnetic components, each having a different primary direction of motion. The magnetic components may be tuned to the same or different resonant frequencies. Also, the magnetic components may be configured to respond to different magnetic fields. For example, one of the magnetic components may be configured to produce an oscillating motion in response to the application of a first type of magnetic field, and the other magnetic component may be configured to produce a directional force in response to the application of a second type of magnetic field (or in response to the first type of magnetic field).

FIG. 10A shows an example stylus 1000 with two rigidly mounted magnetic components 1004, 1006. In particular, the stylus 1000 includes a body (e.g., a barrel 1002), and a first magnetic component 1004 and a second magnetic component 1006 mounted to or within the barrel 1002. The first and second magnetic components 1004, 1006 may be permanent magnets, magnetic materials, conductive coils, electromagnets, or the like.

The first and second magnetic components 1004, 1006 may be mounted to opposite sides of the barrel 1002. As shown, the polarities of the first and second magnetic components 1004, 1006 are aligned (e.g., with North magnetic poles directed towards a top of the stylus 1000). However, the polarities of one or both of the magnetic components may be reversed, as shown in FIG. 10B, where the South magnetic pole of the second magnetic component 1006 is directed towards the top of the stylus 1000.

Including two (or more) separate magnetic components in a stylus may produce different or improved force or haptic responses. For example, having two magnetic components may be used to amplify or to cancel torques when the stylus is subjected to certain magnetic fields (e.g., torques tending to twist the barrel along its axis or torques tending to turn the barrel perpendicular to its axis). The particular polar alignment, number of magnetic components, and placement and/or orientation of the magnetic components may be selected to produce or optimize desired physical responses.

FIG. 10C shows another example stylus 1010 with multiple magnetic components 1014, 1016, and 1018 within or otherwise incorporated with a barrel 1012. The magnetic components 1014, 1016, 1018 may be permanent magnets or magnetic materials, or they may be coils that can be selectively activated to act as magnets (or any other suitable magnetic component). Including multiple permanent magnets or magnetic materials along the barrel 1012 as shown may improve the physical response of the stylus 1010, for example, by increasing the amount of force acting upon the stylus 1010, thus increasing the magnitude or the detectability of the physical output for a given magnetic field.

Where the magnetic components 1014, 1016, 1018 are coils or other selectively activated magnetic components, different types of physical outputs may be produced by activating various combinations of the magnetic components (or individual magnetic components). For example, due to the different positions relative to a magnetic field, each of the magnetic components 1014, 1016, 1018 may produce a different magnitude of force when activated. Also, the magnetic components 1014, 1016, 1018 may have configurations so that selecting one magnetic component (e.g., 1014) produces a force in a first direction (e.g., parallel to the cover) while selecting another magnetic component (e.g., 1016) produces a force in a second direction (e.g., perpendicular to the cover). The magnetic components 1014, 1016, 1018 may also be used to convey different information to a user. For example, a force output (e.g., a vibration) from one magnetic component (e.g., 1014) may convey that the user should move the stylus 1010 faster, while a force output (e.g., a vibration) from a different magnetic component (e.g., 1018) may convey that the user should move the stylus 1010 slower.

The foregoing figures and description describe electronic devices and styluses that produce physical outputs via the stylus. Physical outputs may include, for example, directional forces, motions, oscillations, vibrations, or other physical or haptic outputs. As noted, such physical outputs may be used to help guide a user's hand when providing inputs to an electronic device with the stylus. For example, the stylus may vibrate to indicate when the stylus has deviated from a predicted path, or a directional force may be applied to force the user's hand towards a target location. These effects are produced via magnetic and/or electromagnetic interaction between the stylus and a magnetic field. Similar effects and functions may also be achieved with rolling-point styluses that have directional, frictional, or other types of physical control over a rolling tip.

Figure 11:
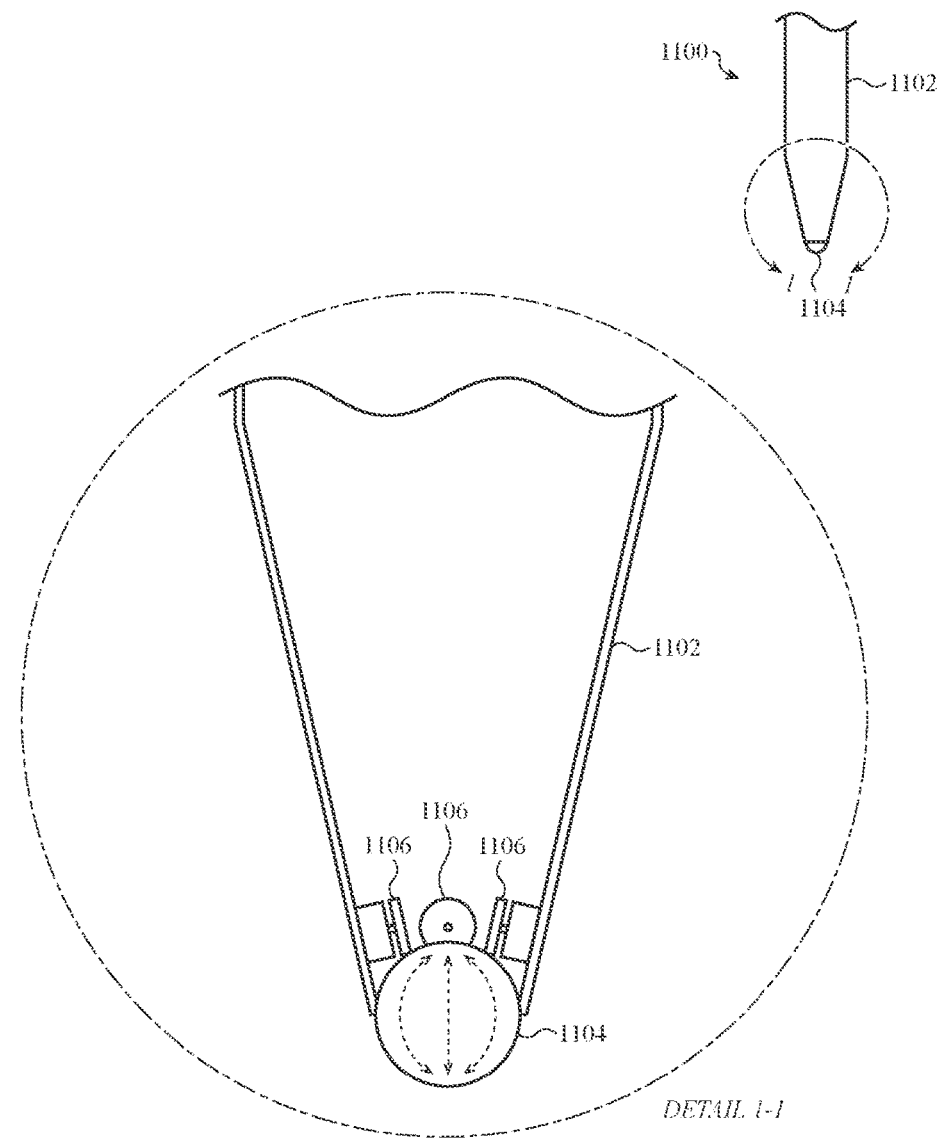
FIG. 11 depicts an example stylus with a driven rolling-ball mechanism.

For example, FIG. 11 shows a rolling-point stylus 1100 that includes a barrel 1102 and a rolling ball 1104 retained to the barrel 1102. The rolling ball 1104 may be capable of rotating in substantially any direction, similar to the ball of a ballpoint pen. The stylus 1100 also includes actuators 1106 that are configured to drive the rolling ball 1104. The actuators 1106 may be any suitable actuator, such as rotational motors with friction wheels, piezoelectric actuators or motors, or the like.

The actuators 1106 may be controllable by the stylus 1100 and/or an associated electronic device to impart directional forces on the stylus 1100 when the rolling ball 1104 is in contact with an input surface of the electronic device. For example, the actuators may impart forces on the ball 1104 that tend to move the stylus 1100 in a desired direction, such as towards a target location or along a target input path. In some cases, the actuators 1106 may have sufficient power to move the stylus 1100 when the stylus is being held in a user's hand. In other cases, the actuators 1106 may not be able to overcome the force and/or inertia of a user's hand, but may nevertheless produce noticeable forces that can help guide the stylus 1100 in a particular direction.

The stylus 1100 may include onboard power sources (e.g., batteries, capacitors), processors, memory, communications circuitry, position and/or orientation sensors, accelerometers, and the like, to facilitate control and operation of the actuators 1106. The stylus 1100 may communicate with an electronic device (e.g., the electronic device 102, FIG. 1A) to receive information and commands relating to operation of the actuators 1106. For example, the electronic device may convey information such as a current location and a target location, and the stylus 1100 may process such information to determine how to operate the actuators 1106 to produce a force towards the target location.

The rolling-point stylus 1100 may be used in addition to or instead of the magnetic and systems described herein. In some cases, for example, an interface system may include a driven rolling-ball mechanism to produce directional forces, and a magnetic field source and a stylus-mounted magnetic element to produce vibrating outputs.

Figure 12:
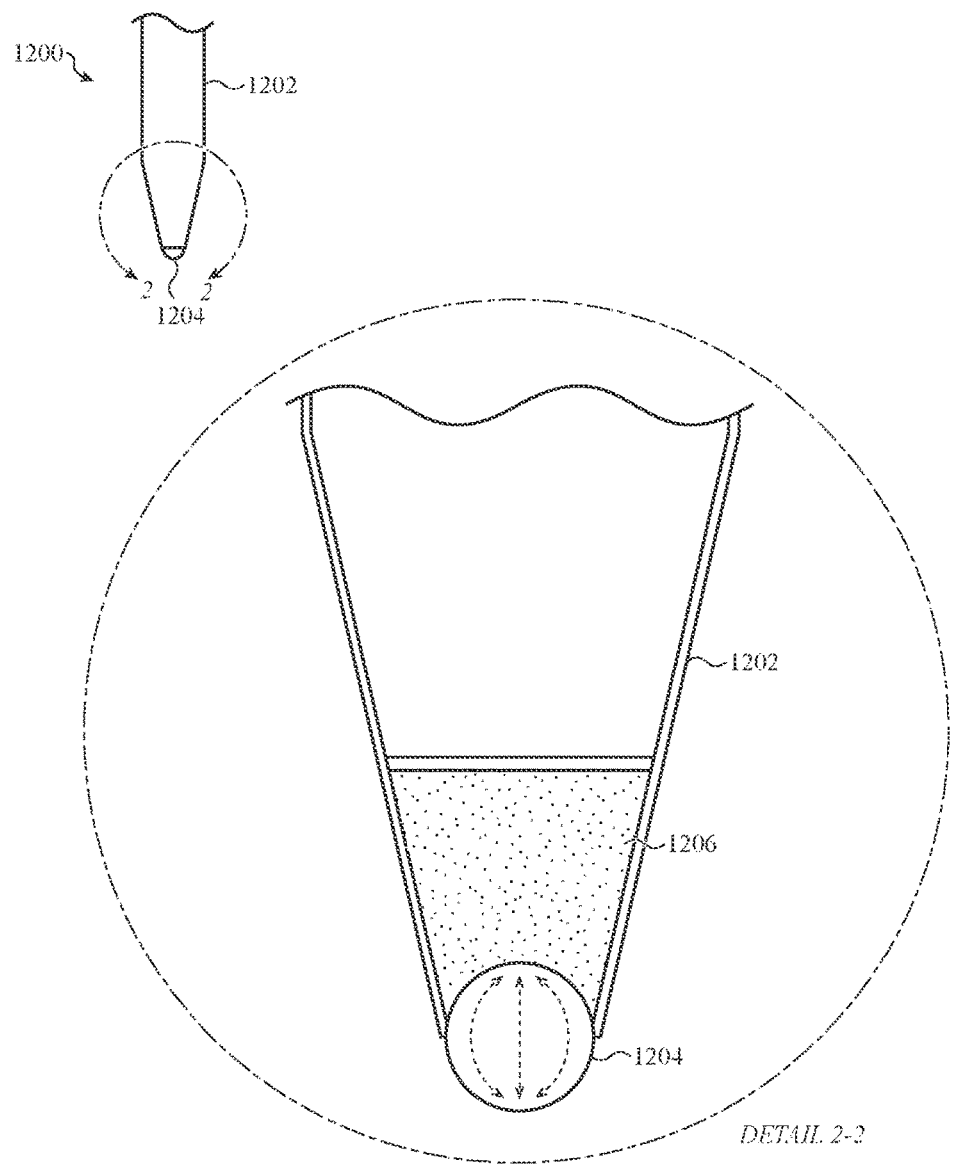
FIG. 12 depicts an example stylus with a variable friction rolling-ball mechanism.

FIG. 12 shows an example of a rolling-point stylus 1200 that uses a fluid to vary the rolling resistance of the ball. In particular, the stylus 1200 includes a barrel 1202 and a rolling ball 1204 retained to the barrel 1202. The rolling ball 1204 may be capable of rotating in substantially any direction, similar to a ballpoint pen. The stylus 1200 also includes a controllable fluid 1206 (e.g., a magnetorheological fluid) or other actuator that can selectively control the rolling resistance of the ball 1204 by changing a property of the fluid 1206. The stylus 1200 may control the properties of the fluid 1206 in any suitable way, such as by applying or removing an electrical current or a magnetic field to the fluid

1206. The fluid 1206 may directly contact the ball 1204, or it may be used to force a friction pad or other member against the ball 1204. Also, in some cases, an actuator may not use fluid, but instead may impart a force to vary the rolling resistance using other techniques. For example, the stylus may use an electrical (e.g., a solenoid) actuator.

By varying the rolling resistance of the ball 1204, the stylus 1200 may provide physical and/or tactile information to a user. For example, the rolling resistance of the ball 1204 may be increased when a user moves the stylus 1200 off a suggested path or away from a target location, which may help guide the user back to the suggested path or towards the target location. In some cases, the rolling resistance increases in proportion to the distance away from a suggested path or target location. For example, small deviations may result in only small increases in resistance, while larger deviations result in large increases in resistance. This may help provide directional feedback to a user, as they will be able to determine by feel whether they are moving the stylus in a target direction.

The stylus 1200 may include onboard power sources (e.g., batteries), processors, memory, communications circuitry, position and/or orientation sensors, magnetic field sources, accelerometers, and the like, to facilitate control and operation of the controllable fluid 1206 (or other actuator). The stylus 1200 may communicate with an electronic device (e.g., the electronic device 102, FIG. 1A) to receive information and commands relating to operation of the controllable fluid 1206. For example, the electronic device may convey information such as a current location and a target location, and the stylus 1200 may process such information to determine whether and how much to increase (or decrease) the rolling resistance of the ball 1204. As noted, instead of a controllable fluid, similar outputs may be achieved by a friction pad and an actuator that can vary the force of the friction pad against the ball 1204.

Figure 13A:
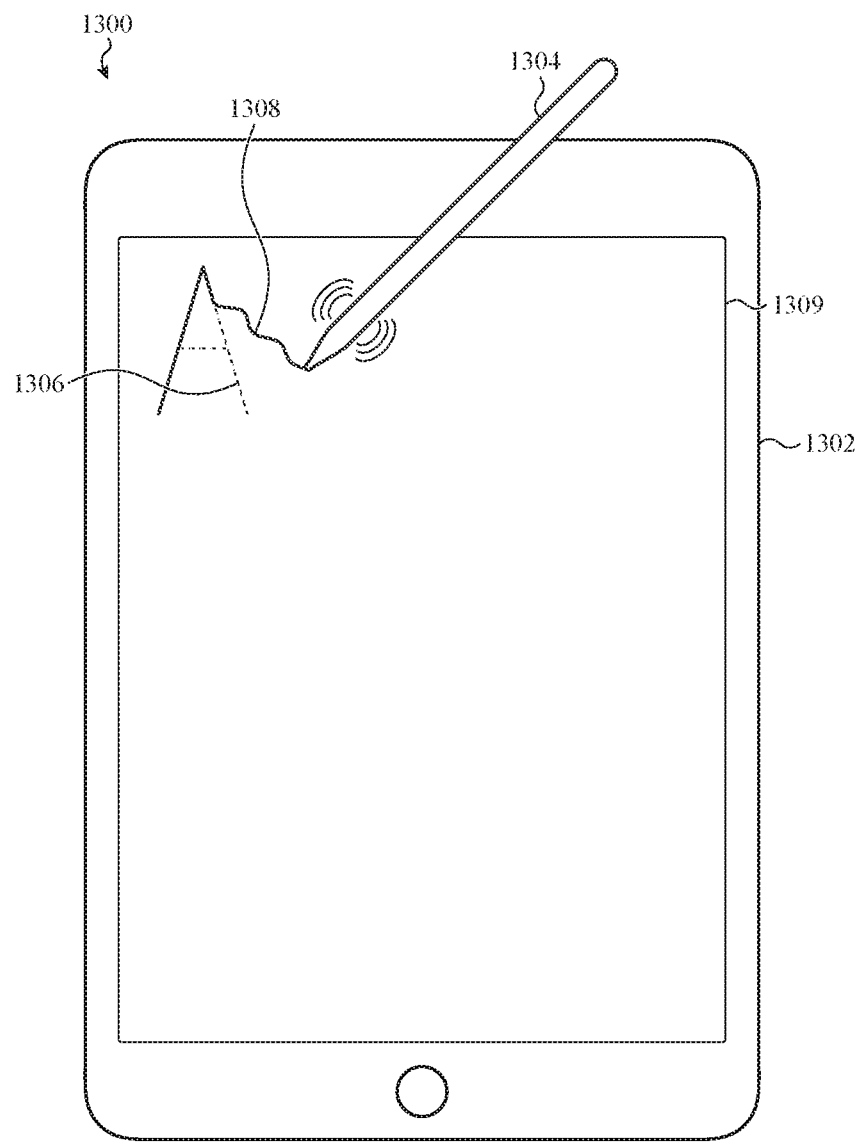
FIGS. 13A-13D depict an interface system in example use scenarios.

FIGS. 13A-13D illustrate several example uses cases of an interface system in accordance with the present description, in which force and/or motion-based outputs (e.g., directional forces, haptic outputs) are used to provide various user experiences. FIG. 13A shows an interface system 1300 that includes an electronic device 1302 and a stylus 1304. The electronic device 1302 and the stylus 1304 may include any of the components described herein for producing force-based outputs, such as magnetic field sources (e.g., conductive coils, power sources, magnets, or other magnetic field generators), magnetic components (e.g., permanent magnets, electromagnets, electromagnetic coils, resonant actuators, and the like), touch and/or force sensors, rolling-point mechanisms, or the like.

The electronic device 1302 is depicted as a tablet computer with a display 1309 that defines a touch-sensitive input surface. In some cases, the electronic device 1302 may be a drawing tablet or other input device without a screen incorporated with the touch-sensitive input surface. In such cases, the electronic device 1302 may be communicatively coupled to a display, such as when a drawing tablet is being used as a peripheral input device to a notebook, tablet, or desktop computer.

FIG. 13A shows an example of a haptic output being produced during a writing training exercise. For example, the electronic device 1302 is displaying an outline of a letter 1306 that is intended for the user to trace. This may be part of an educational application for individuals learning to write or learning a new language or alphabet.

As the user traces the outline or path of the letter 1306, the electronic device 1302 detects the location of the stylus 1304 on the input surface. As long as the stylus 1304 is within a certain threshold distance of the path corresponding to the outline of the letter 1306, the stylus 1304 may not produce any haptic outputs. If the electronic device 1302 determines that the stylus 1304 has deviated from the outline of the letter 1306 (e.g., path 1308), the stylus 1304 may produce a haptic output, such as a vibration (as shown). When a deviation is detected, the stylus 1304 may also or instead produce force-based outputs such as directional forces (as shown in FIG. 13B), increased frictional forces (e.g., by electromagnetically attracting the stylus 1304 to the electronic device 1302 or using a driven or variable-resistance rolling-ball mechanism.

Instead of producing a tactile output in response to detecting a deviation from the input path of the letter, the stylus 1304 may produce a tactile output while it is within range of the input path, and may cease to produce the output when it deviates. For example, the stylus 1304 may vibrate while the pen is sufficiently close to the outline of the letter 1306, and then cease vibrating when a deviation of sufficient magnitude is detected (e.g., path 1308).

Also, a property of the tactile output may change as the deviation from the input path (e.g., the outline of the letter 1306) increases. For example, a magnitude or frequency of a vibration may increase with increased deviation from the path. As another example, the magnitude of a frictional or directional force may increase with increased deviation from the path. In the case where tactile outputs (e.g., vibrations or directional forces) are present only while the stylus 1304 is on or near the input path, the magnitude or frequency of the output may be decreased with increased deviation from the path.

Figure 13B:
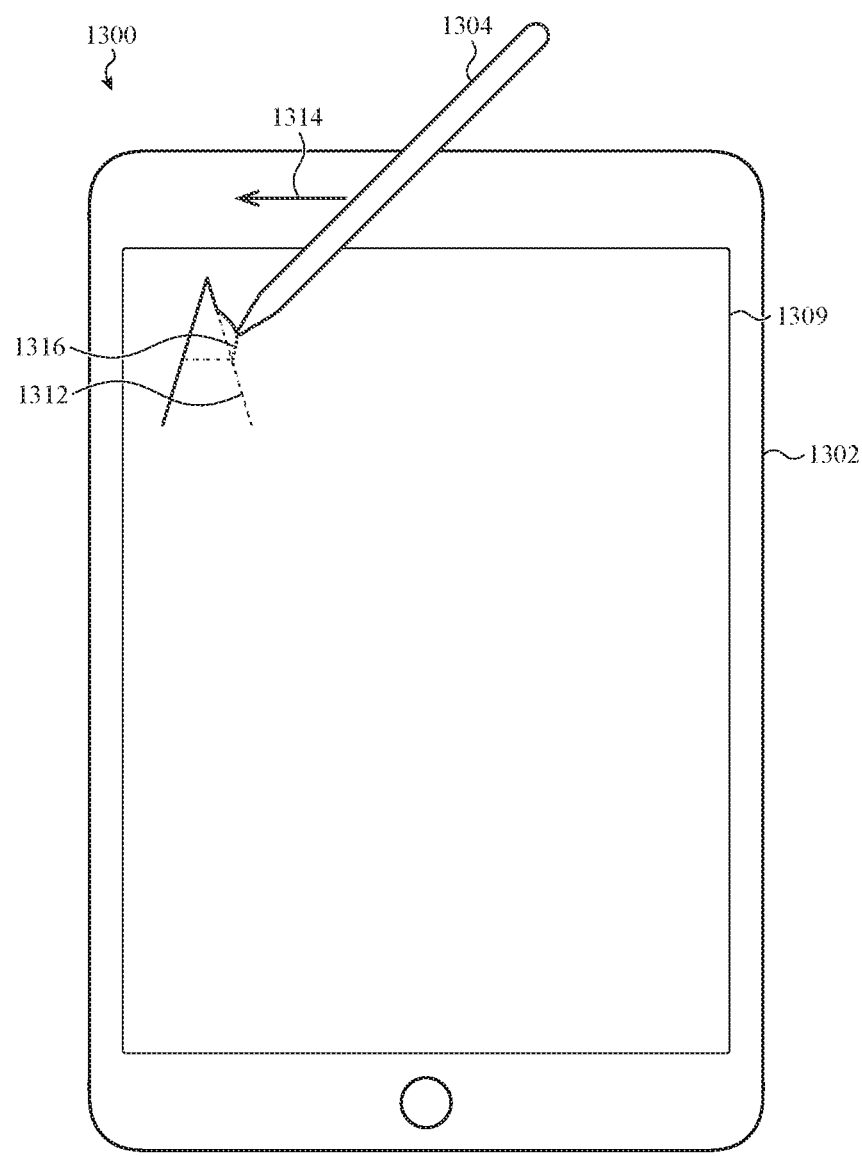

FIG. 13B shows another example tactile output in response to detecting a deviation from a predicted or intended path, such as an outline of a letter 1312. Whereas FIG. 13A showed a vibration or oscillating output, FIG. 13B shows a directional force 1314 acting on the stylus 1304. In particular, as the electronic device 1302 detects a sufficient or threshold deviation between the letter 1312 and the location of the stylus 1304, a magnetic field generator associated with the electronic device 1302 may produce a magnetic field that results in the directional force 1314 on the stylus 1304. Alternatively or additionally, a driven or variable-resistance rolling-ball mechanism may produce the directional force. Feedback devices, such as a touch sensor of the electronic device 1302, or accelerometers, optical sensors, gyroscopes, and the like, in the stylus 1304 may be used to provide positional feedback to control the magnetic fields and/or the rolling-ball mechanisms to produce the desired directional forces.

The directional force 1314 may act in a direction that tends to bring the stylus 1304 nearer to the displayed letter 1312. This may guide a user towards or onto the letter 1312, such as along a path 1316. To help guide the user and to provide dynamic and useful feedback, the force 1314 may increase with increased deviation from the displayed letter 1312.

Instead of or in addition to the directional force 1314 in response to deviations from a predicted or intended path, the interface system 1300 may produce directional forces that lead the stylus 1304 along the path (e.g., along the letter 1312). This may provide continuous force-assisted feedback that guides the user along an intended path instead of merely providing feedback when the user deviates from the path.

FIGS. 13A-13B show tactile outputs (e.g., directional forces, vibrations) being provided in conjunction with drawing or tracing letters. The same or similar process may be implemented with other characters, images, shapes, alphabets, gestures, and the like.

Figure 13C:
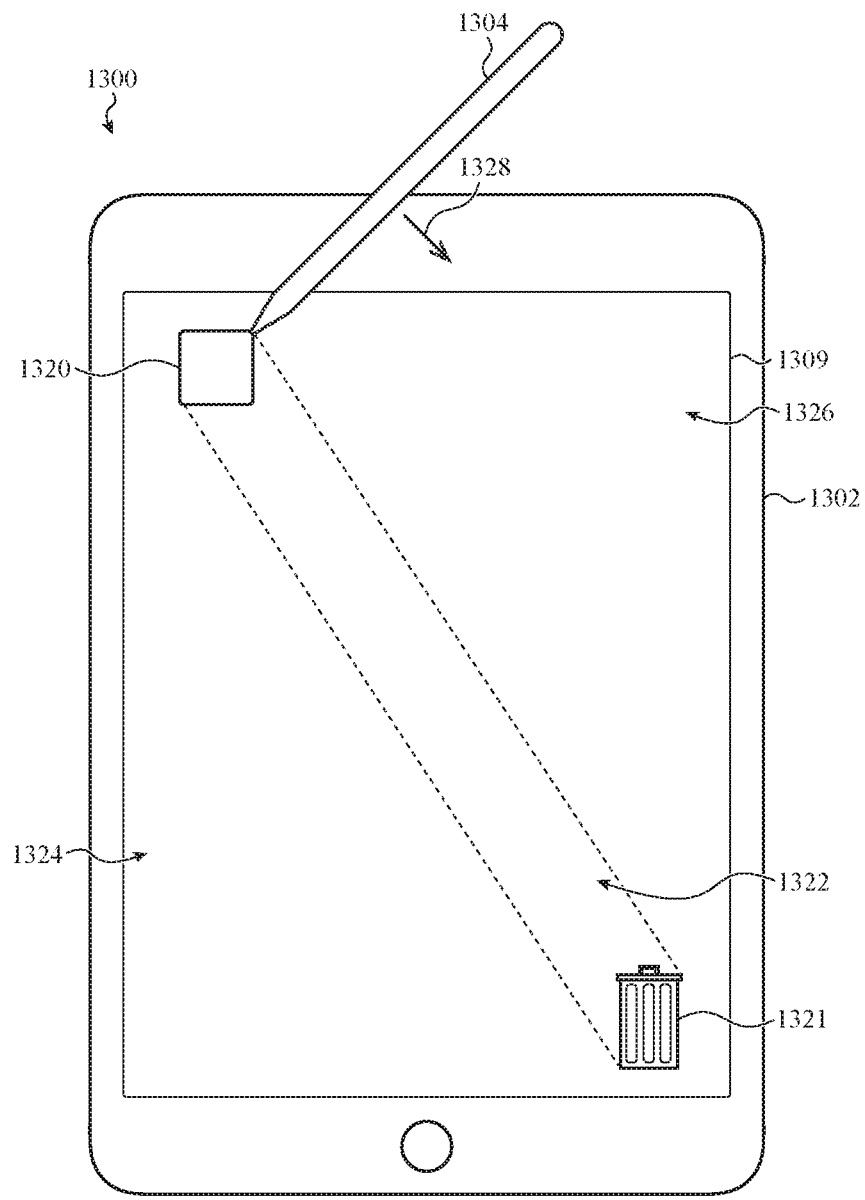

FIG. 13C shows another example use case for the interface system 1300. In particular, FIG. 13C shows a tactile output being provided to assist or suggest a graphical user interface manipulation. For example, FIG. 13C shows an object 1320 (which may be an application icon, a cursor, an image, or any other user interface or display object) and a target location 1321 (shown as a trash or recycle bin, which is merely an example of a target location). The stylus 1304 may be used to select the object 1320 and drag the object along a path 1322 to the target location 1321.

In order to guide the user to the target location 1321, the interface system 1300 may produce a directional force 1328 on the stylus 1304 that acts in the direction of the target location 1321 and/or along the path 1322. Should the stylus 1304 deviate from the path 1322 (such as by entering regions 1324, 1326), the directional force 1328 may change in magnitude and/or direction to continue to guide the user towards the target location 1321 or back to the path 1322. The directional force 1328 may be produced by electromagnetic components or by driven or variable-resistance rolling-ball mechanisms.

In addition to or instead of the directional force 1328, the interface system 1300 may produce other tactile or physical outputs when deviations from the path 1322 are detected. For example, if the electronic device 1302 or the stylus 1304 detects that the stylus is in region 1324 or 1326 of the display 1309, the stylus 1304 may vibrate (or a rolling resistance may be increased) to indicate that the user has deviated from the path 1322.

Figure 13D:
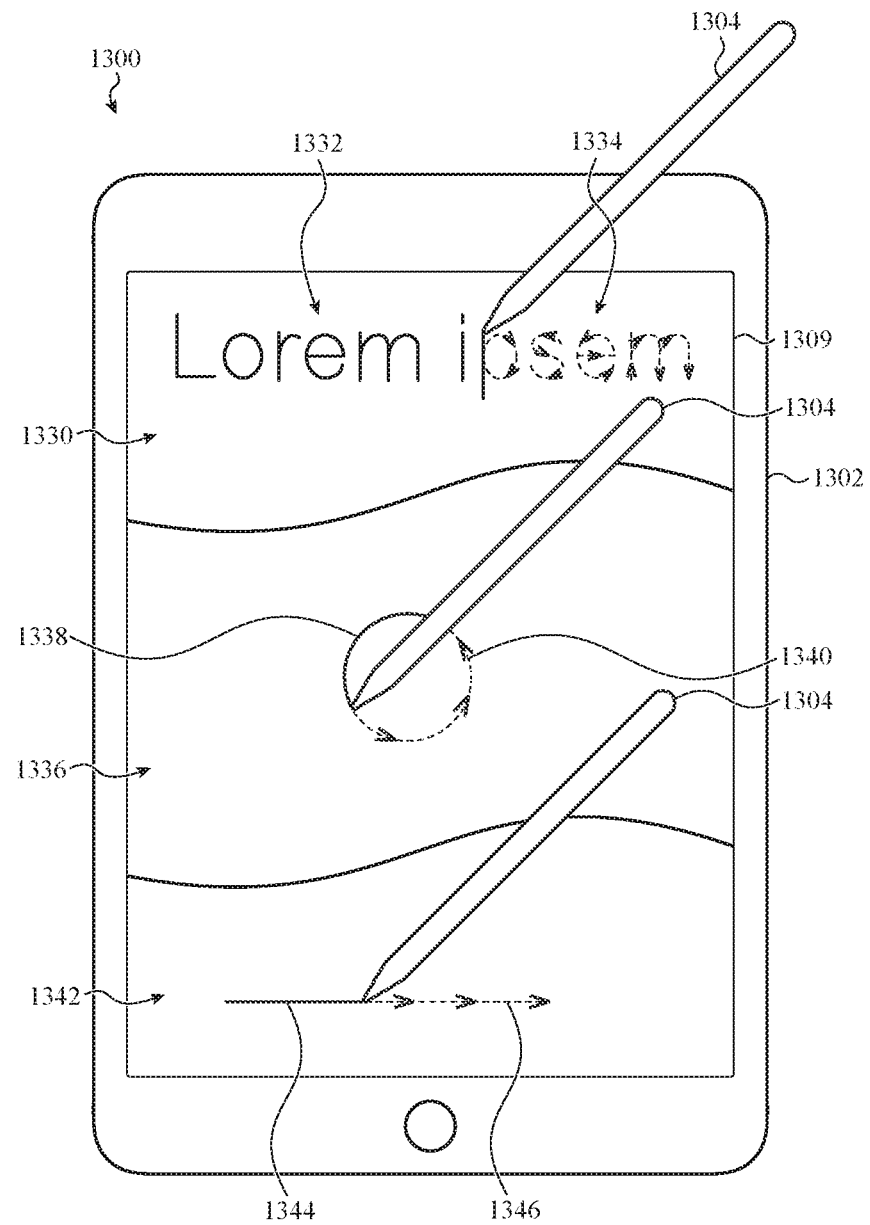

FIG. 13D shows another example use case for the interface system 1300. In particular, FIG. 13D combines predictive input determination with stylus-based physical outputs to help guide a stylus along a predicted path. FIG. 13D shows three example predictive inputs in display regions 1330, 1336, and 1342. It will be understood that these regions are not necessarily displayed at the same time, but rather are differentiated to illustrate several example uses cases of a predictive input feature.

FIG. 13D, and in particular region 1330, shows tactile outputs being used in conjunction with predictive text input. In particular, the electronic device 1302 and/or the stylus 1304 may determine a predicted input letter or word (e.g., word 1334) based on one or more previously entered letters or words (e.g., word 1332). Any suitable text or word prediction technique may be used to predict input words, such as natural language processing algorithms.

Once the predicted input word 1334 is determined, tactile or physically detectable outputs are used to help guide the stylus 1304 along the path of the predicted word 1334. The tactile outputs may include directional forces (e.g., forces that tend to move the stylus 1304 along a path corresponding to the predicted letters), vibrations (e.g., indicating that the user is on or has deviated from the path), or the like. Such outputs may be produced in any suitable way, such as those described herein. Also, the predicted path may be displayed on the display 1309, or it may not be displayed.

The region 1336 shows another example predictive input, where the electronic device 1302 and/or the stylus 1304 predicts that the user is intending to draw a circle. This prediction may be based on detecting a portion of the shape 1338 that was input without external assistance (e.g., without physical influence on the stylus). Once it is determined that the user may be intending to input a circle, a tactile output is provided to guide the user along or towards the predicted path 1340 (or to indicate deviation from or adherence to the predicted path 1340). The region 1342 shows another example predictive input, but instead of a circle 1338, the initial input 1344 is determined to be a beginning of a straight line. Accordingly, the predicted path 1346 continues the straight line in the direction of travel.

Figure 14:
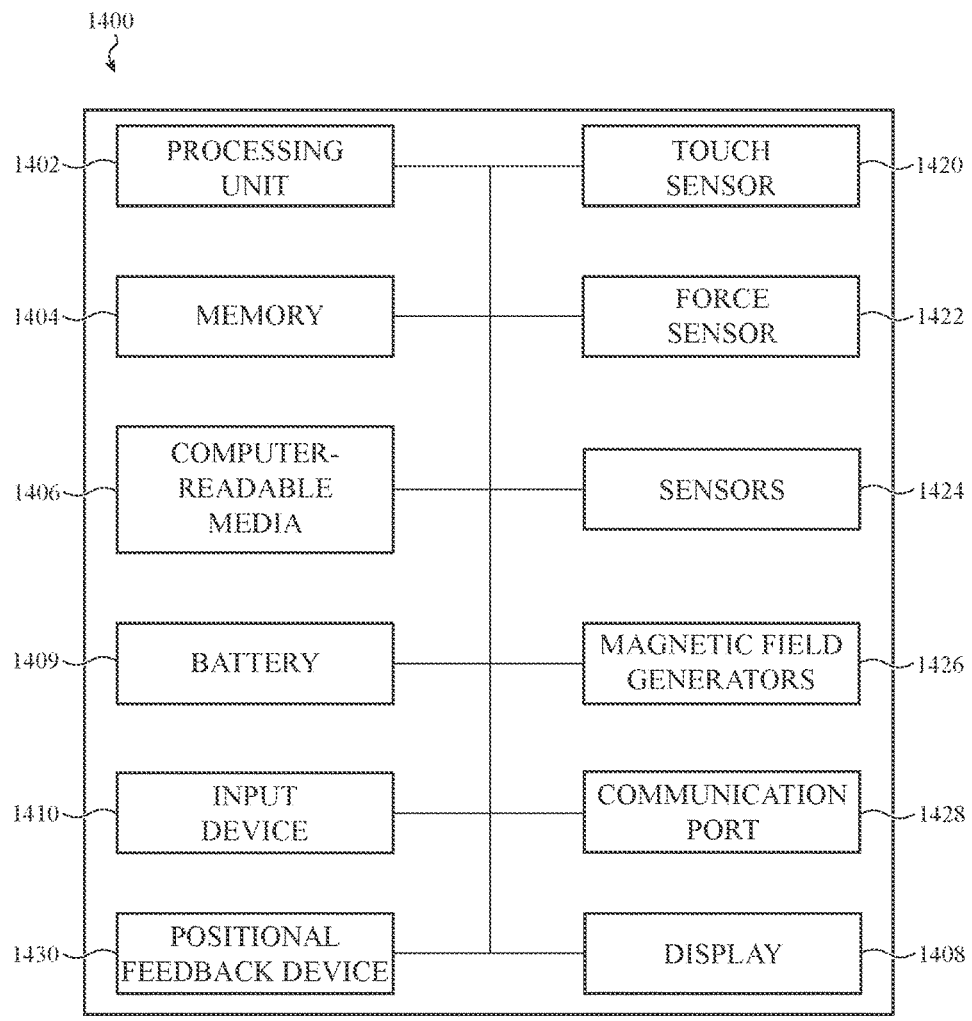
FIG. 14 depicts example components of an electronic device.

FIG. 14 depicts example components of an electronic device in accordance with the embodiments described herein. The schematic representation depicted in FIG. 14 may correspond to components of the electronic devices depicted in the foregoing figures, such as the electronic devices 102, 302, 402, 502, 602, 702, 802, or 1302.

As shown in FIG. 14, a device 1400 includes a processing unit 1402 operatively connected to computer memory 1404 and/or computer-readable media 1406. The processing unit 1402 may be operatively connected to the memory 1404 and computer-readable media 1406 components via an electronic bus or bridge. The processing unit 1402 may include one or more computer processors or microcontrollers that are configured to perform operations in response to computer-readable instructions. The processing unit 1402 may include the central processing unit (CPU) of the device. Additionally or alternatively, the processing unit 1402 may include other processors within the device including application specific integrated chips (ASIC) and other microcontroller devices.

The memory 1404 may include a variety of types of non-transitory computer-readable storage media, including, for example, read access memory (RAM), read-only memory (ROM), erasable programmable memory (e.g., EPROM and EEPROM), or flash memory. The memory 1404 is configured to store computer-readable instructions, sensor values, and other persistent software elements. Computer-readable media 1406 also includes a variety of types of non-transitory computer-readable storage media including, for example, a hard-drive storage device, a solid-state storage device, a portable magnetic storage device, or other similar device. The computer-readable media 1406 may also be configured to store computer-readable instructions, sensor values, and other persistent software elements.

In this example, the processing unit 1402 is operable to read computer-readable instructions stored on the memory 1404 and/or computer-readable media 1406. The computer-readable instructions may adapt the processing unit 1402 to perform the operations or functions described above with respect to FIGS. 1A-13B or below with respect to the example process 1600 in FIG. 16. In particular, the processing unit 1402, the memory 1404, and/or the computer-readable media 1406 may be configured to cooperate with the touch sensor 1420, magnetic field generators 1426, and/or positional feedback devices 1430 to produce magnetic fields resulting in electromagnetic forces on a magnetic component of a stylus. The computer-readable instructions may be provided as a computer-program product, software application, or the like.

As shown in FIG. 14, the device 1400 also includes a display 1408. The display 1408 may include a liquid-crystal display (LCD), organic light emitting diode (OLED) display, LED display, or the like. If the display 1408 is an LCD, the display 1408 may also include a backlight component that can be controlled to provide variable levels of display brightness. If the display 1408 is an OLED or LED type display, the brightness of the display 1408 may be controlled by modifying the electrical signals that are provided to display elements. The display 1408 may correspond to the any of the displays shown or described herein.

The device 1400 may also include a battery 1409 that is configured to provide electrical power to the components of the device 1400. The battery 1409 may include one or more power storage cells that are linked together to provide an internal supply of electrical power. The battery 1409 may be operatively coupled to power management circuitry that is configured to provide appropriate voltage and power levels for individual components or groups of components within the device 1400. The battery 1409, via power management circuitry, may be configured to receive power from an external source, such as an AC power outlet. The battery 1409 may store received power so that the device 1400 may operate without connection to an external power source for an extended period of time, which may range from several hours to several days.

In some embodiments, the device 1400 includes one or more input devices 1410. The input device 1410 is a device that is configured to receive user input. The input device 1410 may include, for example, a push button, a touch-activated button, a keyboard, a key pad, or the like. In some embodiments, the input device 1410 may provide a dedicated or primary function, including, for example, a power button, volume buttons, home buttons, scroll wheels, and camera buttons. Generally, a touch sensor (e.g., a touchscreen) or a force sensor may also be classified as an input device. However, for purposes of this illustrative example, the touch sensor 1420 and the force sensor 1422 are depicted as distinct components within the device 1400.

The device 1400 may also include a touch sensor 1420 (e.g., the touch sensor 410, FIG. 4B) that is configured to determine a location of a touch over a touch-sensitive surface of the device 1400. The touch sensor 1420 may include a capacitive array of electrodes or nodes that operate in accordance with a mutual-capacitance or self-capacitance scheme. As described herein, the touch sensor 1420 may be integrated with one or more layers of a display stack to provide the touch-sensing functionality of a touchscreen.

The device 1400 may also include a force sensor 1422 that is configured to receive and/or detect force inputs applied to a user input surface of the device 1400. The force sensor 1422 may include or be coupled to capacitive sensing elements that facilitate the detection of changes in relative positions of the components of the force sensor (e.g., deflections caused by a force input).

The device 1400 may also include one or more sensors 1424 that may be used to detect an environmental condition, orientation, position, or some other aspect of the device 1400. Example sensors 1424 that may be included in the device 1400 include, without limitation, one or more accelerometers, gyrometers, inclinometers, goniometers, or magnetometers. The sensors 1424 may also include one or more proximity sensors, such as a magnetic hall-effect sensor, inductive sensor, capacitive sensor, continuity sensor, and the like.

The sensors 1424 may also be broadly defined to include wireless positioning devices including, without limitation, global positioning system (GPS) circuitry, Wi-Fi circuitry, cellular communication circuitry, and the like. The device 1400 may also include one or more optical sensors including, without limitation, photodetectors, photosensors, image sensors, infrared sensors, and the like.

The device 1400 may also include a communication port 1428 that is configured to transmit and/or receive signals or electrical communication from an external or separate device. The communication port 1428 may be configured to couple to an external device via a cable, adaptor, or other type of electrical connector. In some embodiments, the communication port 1428 may be used to couple the device 1400 to an accessory, such as a dock or case (e.g., the dock 610, 710, 810 described above), a stylus or other input device, smart cover, smart stand, keyboard, or other device configured to send and/or receive electrical signals.

Figure 15:
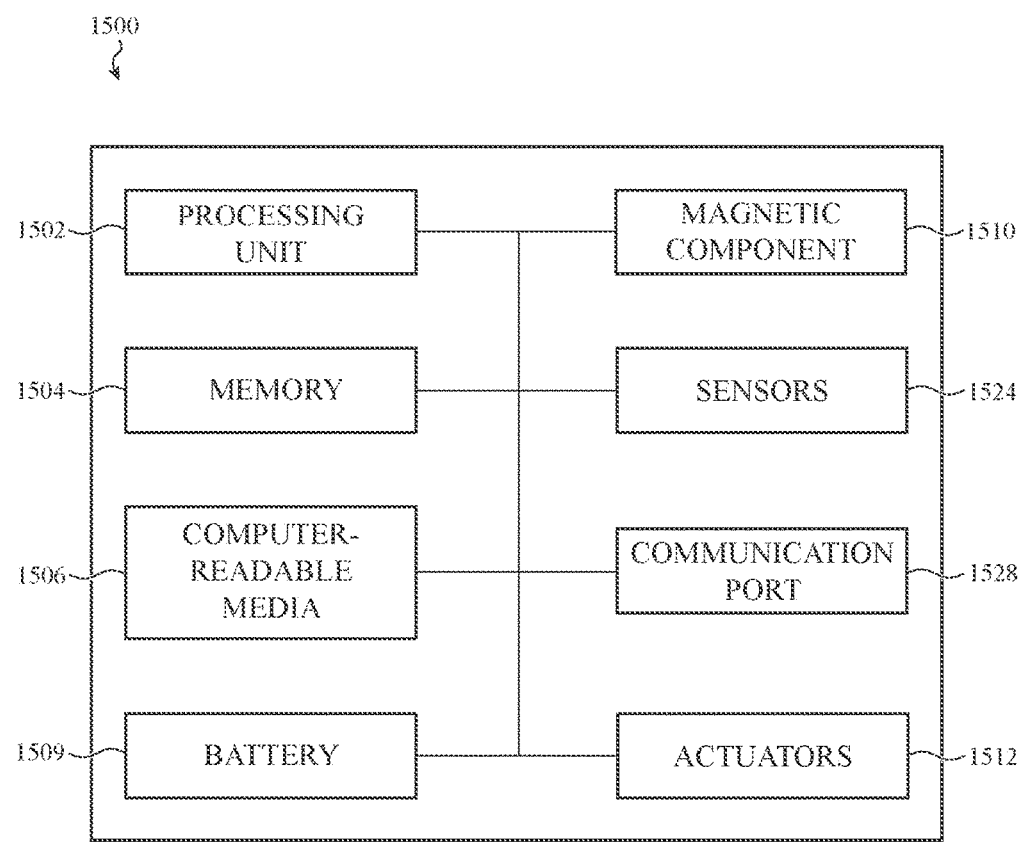
FIG. 15 depicts example components of a stylus.

FIG. 15 depicts example components of a stylus in accordance with the embodiments described herein. The schematic representation depicted in FIG. 15 may correspond to components of the styluses depicted in the foregoing figures, such as the stylus 104, 900, 910, 1000, 1100, 1200, or 1304.

As shown in FIG. 15, a stylus 1500 includes a processing unit 1502 operatively connected to computer memory 1504 and/or computer-readable media 1506. The processing unit 1502 may be operatively connected to the memory 1504 and computer-readable media 1506 components via an electronic bus or bridge. The processing unit 1502 may include one or more computer processors or microcontrollers that are configured to perform operations in response to computer-readable instructions. The processing unit 1502 may include the central processing unit (CPU) of the device. Additionally or alternatively, the processing unit 1502 may include other processors within the device including application specific integrated chips (ASIC) and other microcontroller devices.

The memory 1504 may include a variety of types of non-transitory computer-readable storage media, including, for example, read access memory (RAM), read-only memory (ROM), erasable programmable memory (e.g., EPROM and EEPROM), or flash memory. The memory 1504 is configured to store computer-readable instructions, sensor values, and other persistent software elements. Computer-readable media 1506 also includes a variety of types of non-transitory computer-readable storage media including, for example, a hard-drive storage device, a solid-state storage device, a portable magnetic storage device, or other similar device. The computer-readable media 1506 may also be configured to store computer-readable instructions, sensor values, and other persistent software elements.

In this example, the processing unit 1502 is operable to read computer-readable instructions stored on the memory 1504 and/or computer-readable media 1506. The computer-readable instructions may adapt the processing unit 1502 to perform the operations or functions described above with respect to FIGS. 1A-13B or below with respect to the example process 1600 in FIG. 16. In particular, the processing unit 1502, the memory 1504, and/or the computer-readable media 1506 may be configured to cooperate with magnetic component 1510, positional feedback devices (e.g., sensors 1524), and/or actuators 1512 to produce tactile outputs via the stylus 1500. The computer-readable instructions may be provided as a computer-program product, software application, or the like.

The stylus 1500 may also include a battery 1509 that is configured to provide electrical power to the components of the stylus 1500. The battery 1509 may include one or more power storage cells that are linked together to provide an internal supply of electrical power. The battery 1509 may be operatively coupled to power management circuitry that is configured to provide appropriate voltage and power levels for individual components or groups of components within the stylus 1500. The battery 1509, via power management circuitry, may be configured to receive power from an external source, such as an AC power outlet. The battery 1509 may store received power so that the stylus 1500 may operate without connection to an external power source for an extended period of time, which may range from several hours to several days.

In some embodiments, the stylus 1500 includes one or more magnetic components 1510. The magnetic components 1510 may be passive magnetic components (e.g., ferritic materials or permanent magnets) or active magnetic components (e.g., programmable magnets, electromagnets, conductive coils, or the like). The magnetic components 1510 may be controlled by the processing unit 1502, the memory 1504, and/or computer-readable media 1506 to produce desired tactile outputs.

The stylus 1500 may also include one or more sensors 1524 that may be used to detect an environmental condition, orientation, position, or some other aspect of the stylus 1500. Example sensors 1524 that may be included in the stylus 1500 include, without limitation, one or more accelerometers, gyrometers, inclinometers, goniometers, optical sensors, inertial positioning sensors, or magnetometers. The sensors 1524 may also include one or more proximity sensors, such as a magnetic hall-effect sensor, inductive sensor, capacitive sensor, continuity sensor, and the like.

The sensors 1524 may also be broadly defined to include wireless positioning devices including, without limitation, global positioning system (GPS) circuitry, Wi-Fi circuitry, cellular communication circuitry, and the like. The stylus 1500 may also include one or more optical sensors including, without limitation, photodetectors, photosensors, image sensors, infrared sensors, and the like.

The stylus 1500 may also include a communication port 1528 that is configured to transmit and/or receive signals or electrical communication from an external or separate device. The communication port 1528 may be configured to couple to an external device via a cable, adaptor, or other type of electrical connector. In some embodiments, the communication port 1528 may be used to couple the stylus 1500 to an electronic device (e.g., the electronic device 1400 or any other electronic device described herein), an accessory such as a dock or case (e.g., the dock 610, 710, 810 described above), or any other device configured to send and/or receive electrical signals.

The stylus 1500 may also include one or more actuators 1512. The actuators may include rotational motors with friction wheels, piezoelectric actuators, magnetorheological fluid actuators, or the like. The actuators 1512 may be controlled by the processing unit 1502, the memory 1504, and/or computer-readable media 1506 to produce desired tactile outputs, to impart a directional force on the stylus 1500, increase a perceived surface friction when moving the stylus 1500 across an input surface, or produce any other suitable tactile or physical output.

Figure 16:
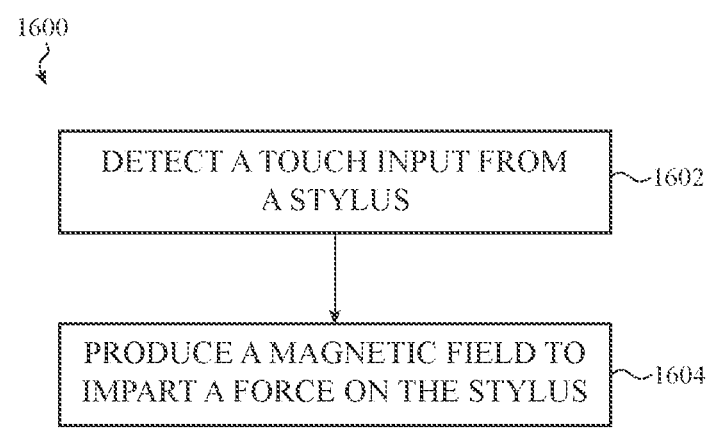
FIG. 16 depicts an example process for producing motion or force outputs in an interface system.

FIG. 16 depicts an example process 1600 for producing tactile or physical outputs via a stylus in an interface system. The process 1600 may be used, for example, to guide a user of a stylus along a particular input path, provide tactile feedback to a user of a stylus about user interface objects, regions, or gestures, or any other suitable function. The process 1600 may be implemented using, for example, the processing unit and other hardware elements described with respect to FIGS. 14-15 (or elsewhere in the instant application). The process 1600 may be implemented as processor-executable instructions that are stored within the memory of an electronic device and/or a stylus.

In operation 1602, a touch input from a stylus having a magnetic component is detected. The touch input may be detected by a touch sensor of an electronic device (such as the touch sensor 1420), or by any other suitable device, module, or sensor of an electronic device, dock, stylus, or the like.

The touch input detected at operation 1602 may be a tap or press at a single location on an electronic device, or a gesture-type input where a stylus is slid, dragged, or otherwise moved across an input surface. In the latter case, detecting the touch input may include detecting a stylus at a first location on an input surface of an electronic device, and detecting the stylus at a second location on the input surface, where the second location is different from the first location.

In operation 1604, in response to detecting the touch input, a magnetic field is produced with a magnetic field generator. The magnetic field imparts a force on the magnetic component of the stylus via the magnetic field, thereby producing a tactile output. The magnetic field may be an alternating magnetic field (which may produce a vibratory output), or a steady (though dynamic and/or changing) magnetic field that is configured to produce a directional force. In some cases, such as where the magnetic field is intended to produce a directional force, producing the magnetic field includes determining a combination of electromagnetic coils that will produce the magnetic field such that the force imparted on the magnetic component is in a particular direction (e.g., towards a target location), and actuating the determined combination of electromagnetic coils.

In some cases, the magnetic field is initiated when the stylus is detected at the first location (e.g., outside a target location or an input path), and is terminated or ceased when the stylus is detected at the second location (e.g., on or within a threshold distance of an input path or target location). For example, a vibration or directional force may be induced in the stylus when the stylus deviates from an input path corresponding to a displayed letter or character (or from a predicted input path), and may be ceased when the stylus returns to or is otherwise detected on the input path. Other example tactile and/or physical outputs and use cases are described herein.

The process may further comprise determining a predicted input path based on at least one of a location and a direction of the touch input. FIGS. 13A-13C show examples in which input paths are predicted for characters, words, shapes, and the like. Accordingly, a tactile or physically detectable output may be induced when the stylus deviates from the predicted input path, and may be ceased when the stylus returns to or is otherwise detected on the predicted input path (or within a threshold distance of the predicted input path).

In some cases, the process further comprises determining a target location of the stylus on an input surface of the electronic device. The target location may correspond to a single, static location on the input surface (e.g., a region of a user interface or an icon displayed on a display), or it may correspond to a next position along an input path. After determining the target location, the magnetic field may be produced such that the force imparted on the magnetic component of the stylus is in the direction of the target location. Instead of or in addition to producing a force toward the target location using magnetic fields, the force may be produced by a driven rolling-ball actuator, such as described above with respect to FIG. 11.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An interface system comprising:
   an electronic device comprising:
      a housing; and
      a cover coupled to the housing and defining an input surface;
   a stylus comprising a magnetic component and configured to provide input to the electronic device via the input surface; and
   a dock configured to be removably coupled to the electronic device and comprising:
      a conductive coil configured to produce a magnetic field to impart a force on the magnetic component of the stylus; and
      a magnetic shunt positioned under the conductive coil.

2. The interface system of claim 1, wherein:
   the electronic device comprises a display within the housing;
   the dock further comprises circuitry configured to energize the conductive coil to produce the magnetic field;
   the magnetic field extends through the housing, through the display, and through the input surface; and
   the magnetic component is configured to interact with the magnetic field.

3. The interface system of claim 1, wherein:
   the dock comprises a group of conductive coils; and
   the conductive coil is one of the group of conductive coils.

4. The interface system of claim 3, wherein the conductive coils of the group of conductive coils are positioned in an overlapping arrangement.

5. A system for magnetically influencing an input device, comprising:
   a computing device comprising:
      an enclosure;
      a touchscreen within the enclosure and configured to:
         detect an input device at a first location on an exterior surface of the touchscreen; and
         detect the input device at a second location on the exterior surface of the touchscreen, the second location different from the first location; and
      an electromagnetic coil within the enclosure; wherein
   the computing device is configured to:
      produce a magnetic field above the exterior surface of the touchscreen, using the electromagnetic coil, in response to detecting the input device at the first location, thereby producing a tactile output via the input device; and
      in response to detecting the input device at the second location, ceasing to produce the magnetic field.

6. The system of claim 5, wherein:
   the input device comprises:
      a body; and
      a magnetic component within the body; and
   the electromagnetic coil is configured to produce the magnetic field around the magnetic component of the input device.

7. The system of claim 6, wherein:
   the electromagnetic coil is a first electromagnetic coil;
   the magnetic field is a first magnetic field;
   the magnetic component is a second electromagnetic coil; and
   the input device further comprises:
      a power source; and
      circuitry configured to power the second electromagnetic coil to produce a second magnetic field.

8. The system of claim 6, wherein the computing device further comprises control circuitry configured to control the electromagnetic coil in order to produce an alternating magnetic field.

9. The system of claim 6, wherein the magnetic component is a permanent magnet.

10. The system of claim 6, wherein the input device further comprises a spring movably supporting the magnetic component to the body.

11. The system of claim 10, wherein the movably supported magnetic component has a resonant frequency between about 150 Hz and about 250 Hz.

12. A method, comprising:
   detecting, at an electronic device with a touch sensor and a magnetic field source, a touch input from an input device having a magnetic component, the detecting comprising detecting the input device at a first location on an input surface of the electronic device;
   in response to detecting the input device at the first location, producing a magnetic field with the magnetic field source, thereby imparting a force on the magnetic component of the input device;
   detecting the input device at a second location on the input surface, the second location different from the first location; and
   in response to detecting the input device at the second location, ceasing to produce the magnetic field.

13. The method of claim 12, wherein:
   detecting the input device at the first location on the input surface of the electronic device comprises detecting the input device outside of an input path along the input surface; and
   detecting the input device at the second location on the input surface comprises detecting the input device within the input path.

14. The method of claim 13, wherein:
   the method further comprises determining a predicted input path based on at least one of a location and a direction of the touch input; and
   the input path corresponds to the predicted input path.

15. The method of claim 12 wherein:
   the method further comprises determining a target location of the input device on the input surface of the electronic device; and
   producing the magnetic field comprises producing the magnetic field such that the force imparted on the magnetic component is in a direction of the target location.

16. The method of claim 15, wherein:
   the magnetic field source comprises a plurality of coils; and
   producing the magnetic field comprises:

determining a combination of coils that will produce the magnetic field such that the force imparted on the magnetic component is in the direction of the target location; and actuating the determined combination of coils.

17. The method of claim 12, wherein:

detecting the input device at the first location on the input surface of the electronic device comprises detecting the input device within a threshold distance from a graphical object displayed by the electronic device; and detecting the input device at the second location on the input surface comprises detecting the input device beyond the threshold distance from the graphical object displayed by the electronic device.

18. An interface system comprising:

an electronic device comprising:

a housing; and a cover coupled to the housing and defining an input surface;

a stylus comprising a magnetic component and configured to provide input to the electronic device via the input surface; and a dock configured to be removably coupled to the electronic device and comprising:

a frame defining a recess; and a coil positioned in the frame and configured to produce a magnetic field to impart a force on the magnetic component of the stylus, wherein the electronic device is configured to be received in the recess and at least partially surrounded by the frame.

19. The interface system of claim 18, wherein:

the coil is a first coil; and the dock further comprises a plurality of additional coils positioned in the frame.

20. The interface system of claim 18, wherein:

the coil defines a plurality of turns wrapped about a coil axis; and the coil axis is perpendicular to the input surface of the electronic device when the electronic device is received in the recess.

21. The interface system of claim 18, wherein the force imparted on the magnetic component of the stylus vibrates the stylus.

* * * * *